United States Patent
Harada et al.

(10) Patent No.: US 10,746,286 B2
(45) Date of Patent: Aug. 18, 2020

(54) HYDRAULIC CONTROL DEVICE

(71) Applicant: HONDA MOTOR CO., LTD., Minato-ku, Tokyo (JP)

(72) Inventors: Masamichi Harada, Wako (JP); Kyohei Sakagami, Wako (JP); Makito Nakasone, Wako (JP); Shigeji Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 16/055,189

(22) Filed: Aug. 6, 2018

(65) Prior Publication Data
US 2019/0048998 A1  Feb. 14, 2019

(30) Foreign Application Priority Data
Aug. 10, 2017 (JP) ................. 2017-155240

(51) Int. Cl.
| | |
|---|---|
| F16H 61/00 | (2006.01) |
| F16H 61/662 | (2006.01) |
| F16H 61/664 | (2006.01) |
| F16H 61/02 | (2006.01) |
| F16H 61/14 | (2006.01) |
| F16H 57/04 | (2010.01) |

(52) U.S. Cl.
CPC ..... *F16H 61/0025* (2013.01); *F16H 61/0009* (2013.01); *F16H 61/0031* (2013.01); *F16H 61/0213* (2013.01); *F16H 61/662* (2013.01); *F16H 61/6646* (2013.01); *F16H 61/66259* (2013.01); *F16H 57/0436* (2013.01); *F16H 61/143* (2013.01); *F16H 2061/0209* (2013.01)

(58) Field of Classification Search
CPC .................................................. F16H 61/0031
See application file for complete search history.

(56) References Cited

U.S. PATENT DOCUMENTS

| | | | |
|---|---|---|---|
| 7,827,966 B2 * | 11/2010 | Narisako | F02M 37/22 123/497 |
| 9,777,828 B2 * | 10/2017 | Yoshitani | F16H 61/0021 |
| 2015/0316144 A1 | 11/2015 | Yoshitani et al. | |

FOREIGN PATENT DOCUMENTS

| | | |
|---|---|---|
| JP | 2014-034932 | 2/2014 |
| JP | 2015-200369 | 11/2015 |
| WO | 2014/097345 | 6/2014 |

OTHER PUBLICATIONS

Japanese Office Action for Japanese Patent Application No. 2017-155240 dated Mar. 26, 2019.

* cited by examiner

*Primary Examiner* — Sherry L Estremsky
(74) *Attorney, Agent, or Firm* — Amin, Turocy & Watson, LLP

(57) ABSTRACT

In a hydraulic control device, a hydraulic sensor is provided on an intake side of a second pump where first oil is taken in and a line pressure sensor is provided on a discharging side of the second pump where the second oil is discharged. A control unit controls driving of the second pump by controlling a motor on the basis of an output pressure detected by the output pressure sensor or a line pressure detected by the line pressure sensor.

3 Claims, 13 Drawing Sheets

FIG. 6

| COMMAND ROTATION NUMBER | LOW ⇔ OPTIMAL OPERATION POINT ⇒ HIGH | | |
|---|---|---|---|
| OPERATION STATUS | OPTIMAL CONTROL ZONE | CAUTIOUS ZONE | WARNING ZONE |
| PROBLEM | HUNTING OF P1 DETERIORATION IN FUEL EFFICIENCY DUE TO LOSS OF OPPORTUNITY OF REDUCING WORKLOAD OF MECHANICAL PUMP | HYDRAULIC RESPONSE DELAY DETERIORATION IN FUEL EFFICIENCY DUE TO INCREASE IN POWER CONSUMPTION | INSUFFICIENT CLUTCH PRESSURE DUE TO FURTHER HYDRAULIC RESPONSE DELAY |

HYDRAULIC CONTROL DEVICE

CROSS-REFERENCE TO RELATED APPLICATION

This application is based upon and claims the benefit of priority from Japanese Patent Application No. 2017-155240 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a check valve connected in parallel, and that supplies first oil from the first pump to the hydraulic operation unit through the check valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump (mechanical pump) and a hydraulic operation unit of the transmission, a check valve and a second pump (electric pump) that is operated by driving a motor connected in parallel. In this case, when an engine is started, firstly, first oil is supplied from the first pump to the hydraulic operation unit through the check valve. After that, the second pump is driven by driving the motor to pressurize the first oil that is supplied from the first pump with the second pump and supplies the first oil that is pressurized from the second pump to the hydraulic operation unit as second oil.

SUMMARY OF THE INVENTION

Incidentally, in a case of controlling the driving of the second pump in accordance with a request output depending on a vehicle state, if a rotation number of the second pump becomes excessive with respect to the request output, the second pump and the motor consume power wastefully. As a result, even if the workload of the first pump is reduced by driving the second pump in order to improve the fuel efficiency of the vehicle, the fuel efficiency deteriorates.

When the rotation number of the second pump becomes excessive, the pressure of the oil (second oil) to be supplied to the hydraulic operation unit becomes excessive. Therefore, in that state, when the pump that supplies the oil to the hydraulic operation unit is switched from the second pump to the first pump, a hydraulic response delay occurs in the hydraulic operation unit. Due to this hydraulic response delay, a hydraulic pressure in the hydraulic operation unit may decrease.

The present invention is an improvement of the hydraulic control device according to Japanese Laid-Open Patent Publication No. 2015-200369, and an object is to provide a hydraulic control device that can suppress the deterioration in fuel efficiency of a vehicle and the occurrence of the hydraulic response delay by controlling the second pump optimally.

The present invention relates to a hydraulic control device including, between a first pump and a hydraulic operation unit of a transmission, a check valve and a second pump driven by a motor connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil. In order to achieve the above object, the hydraulic control device includes: a hydraulic sensor provided on at least one of an intake side of the second pump where the first oil is taken in and a discharging side of the second pump where the second oil is discharged, and configured to detect a pressure of the oil at a position where the hydraulic sensor is provided; and a controller configured to control driving of the second pump by controlling the motor on the basis of the pressure of the oil detected by the hydraulic sensor.

Thus, the pressure of the oil that is detected by the hydraulic sensor provided on the intake side or the discharging side of the second pump is fed back to the controller. Therefore, by controlling the motor using the pressure of the oil, the controller can control the second pump optimally. As a result, it is possible to suppress the deterioration in fuel efficiency of the vehicle including the transmission, and the occurrence of the hydraulic response delay in the hydraulic operation unit.

By the hydraulic control device with such a structure, the second pump can be regularly controlled optimally through the motor under various travel conditions of the vehicle. In addition, the workload of the first pump can be cut while the power consumption of the motor and the second pump is minimized. Furthermore, in a case where the pressure of the oil to be supplied to the hydraulic operation unit is excessive, the decrease in hydraulic pressure or the hydraulic response delay when the pump that supplies the oil to the hydraulic operation unit is switched from the second pump to the first pump can be minimized.

Here, the hydraulic control device may further include an operation point decision unit configured to set an operation point of the second pump on the basis of a request flow rate corresponding to a request value of a flow rate of the second oil and a request discharging pressure corresponding to a request value of a discharging pressure of the second pump in accordance with a vehicle state of the vehicle including the transmission.

In this case, the operation point decision unit is configured to perform a feedback control for the request discharging pressure by using the pressure of the oil detected by the hydraulic sensor and set the operation point by using the request discharging pressure after the feedback control and the request flow rate. In addition, the controller is configured to control the motor on the basis of the operation point.

Thus, the second pump can be controlled by using the pressure of the oil that is fed back from the hydraulic sensor, so that the rotation number or the torque becomes optimal.

The hydraulic control device may further include a first hydraulic pressure estimation unit configured to estimate a pressure value of the oil to be supplied from the first pump to another hydraulic operation unit of the transmission. In this case, the hydraulic sensor may be a hydraulic sensor that is provided between the first pump and the second pump and configured to detect the pressure value of the first oil to be supplied to the second pump, and the operation point decision unit may be configured to calculate a feedback amount relative to the request discharging pressure by subtracting the pressure value of the oil estimated by the first hydraulic pressure estimation unit from the pressure value of the first oil detected by the hydraulic sensor.

Alternatively, the hydraulic control device may further include a second hydraulic pressure estimation unit configured to estimate a pressure value of the oil to be supplied to the hydraulic operation unit. In this case, the hydraulic sensor may be a hydraulic sensor that is provided between the second pump and the hydraulic operation unit and configured to detect the pressure value of the oil to be supplied to the hydraulic operation unit, and the operation point decision unit may be configured to calculate a feedback amount relative to the request discharging pressure by subtracting the pressure value of the oil estimated by the second hydraulic pressure estimation unit from the pressure value of the oil detected by the hydraulic sensor.

In any case, the deviation between the pressure value (actually measured value) of the oil that is detected by the hydraulic sensor and the pressure value (estimated value) of the oil that is estimated by the first hydraulic pressure estimation unit or the second hydraulic pressure estimation unit corresponds to the feedback amount, and the operation point decision unit sets the operation point so that the actually measured value becomes the estimated value. As a result, even in a case where there are variations in the actually measured value, the estimated value, the structure and the efficiency of the second pump, and the hydraulic system in the transmission, the driving of the second pump can be controlled optimally by controlling the motor so as to minimize the deviation.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a diagram expressing operation statuses of the second pump based on a command rotation number, and problems depending on the operation statuses;

DESCRIPTION OF THE PREFERRED EMBODIMENTS

A preferred embodiment of a hydraulic control device according to the present invention will hereinafter be described in detail with reference to the attached drawings.

1. Structure of the Present Embodiment

Figure 1:
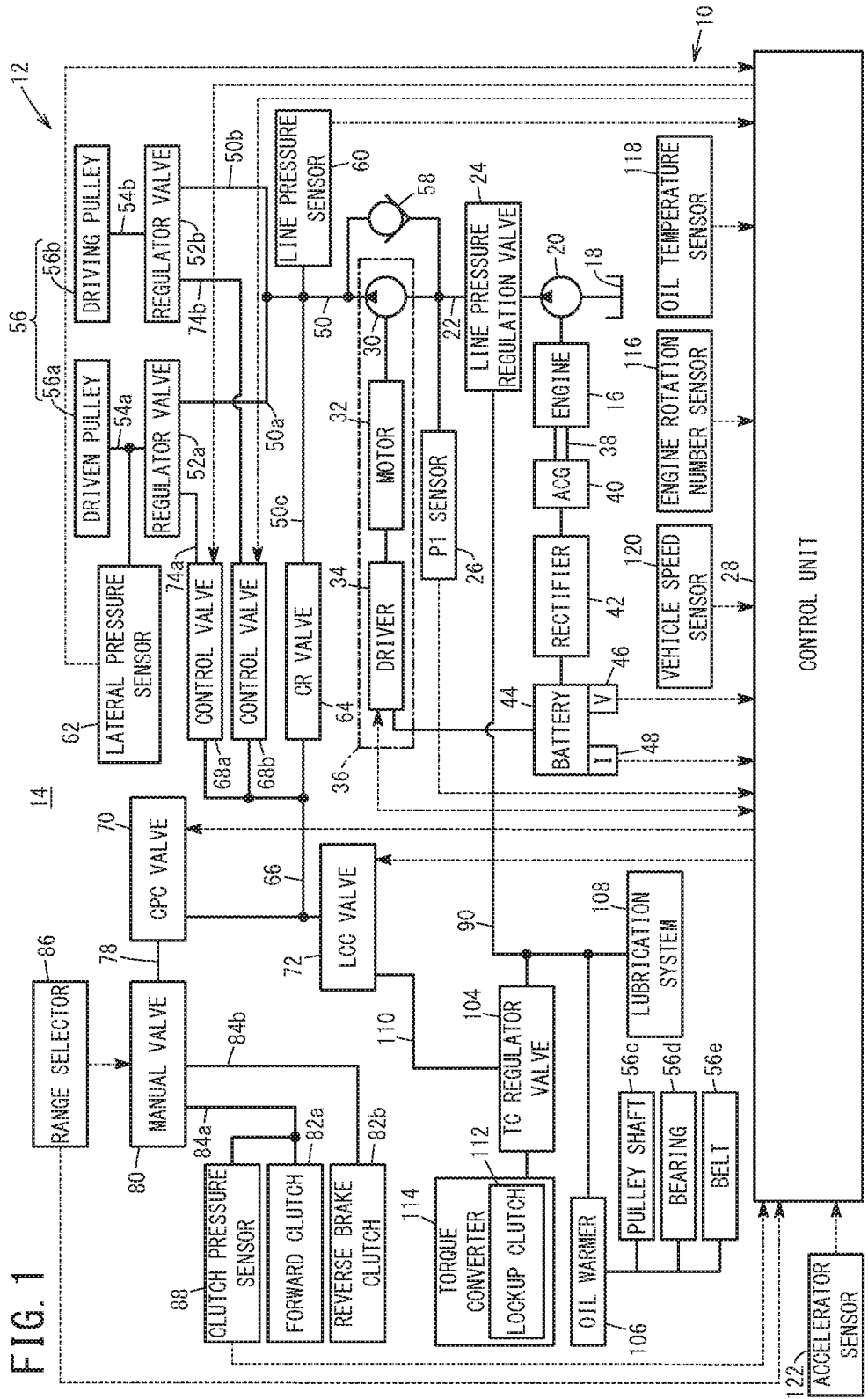
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump (mechanical pump) 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 24 corresponding to a spool valve is provided.

In the oil passage 22, an output pressure sensor (P1 sensor) 26 is disposed on a downstream side relative to the line pressure regulation valve 24. The output pressure sensor 26 is a hydraulic sensor that sequentially detects a pressure (pressure value) P1 of the first oil (output pressure of the first pump 20) flowing in the oil passage 22, and sequentially outputs a detection signal expressing the detected output pressure P1 to a control unit 28 to be described below. On the downstream side in the oil passage 22, a second pump 30 that is smaller in capacity than the first pump 20 is connected.

The second pump 30 is an electric pump that is driven by a rotation of a motor 32 included in the vehicle 14, and that outputs as second oil, the first oil that is supplied through the oil passage 22. In this case, the second pump 30 can pressurize the first oil that is supplied, and transfer the first oil that has been pressurized as the second oil. The motor 32 rotates under a control of a driver 34. The driver 34 controls the driving of the motor 32 on the basis of a control signal supplied from the control unit 28, and moreover, sequentially outputs a signal expressing a driving state of the motor 32 (for example, a rotation number (rotation speed) Nem of the motor 32 in accordance with a rotation number (rotation speed) Nep of the second pump 30) to the control unit 28. The second pump 30, the motor 32, and the driver 34 form an electric pump unit 36.

On the other hand, an alternating-current power generator (ACG) 40 is connected to a crank shaft 38 of the engine 16. The ACG 40 generates power by a rotation of the crank shaft 38 along with driving of the engine 16. The alternating-current power generated by the ACG 40 is rectified by a rectifier 42, and a battery 44 is charged with the rectified power. The battery 44 includes a voltage sensor 46 that detects a voltage V of the battery 44, and a current sensor 48 that detects a current I flowing from the battery 44. The voltage sensor 46 sequentially detects the voltage V of the battery 44, and sequentially outputs the detection signal expressing the detected voltage V to the control unit 28. The current sensor 48 sequentially detects the current I flowing from the battery 44, and sequentially outputs the detection signal expressing the detected current I to the control unit 28. The driver 34 is driven by the power supplied from the battery 44.

An output side of the second pump 30 is connected to an oil passage 50. The oil passage 50 is branched into two oil passages 50a, 50b on the downstream side. One oil passage 50a is connected through a regulator valve 52a and an oil passage 54a to a driven pulley 56a included in a continuously variable transmission mechanism 56 of the transmission 12. The other oil passage 50b is connected through a regulator valve 52b and an oil passage 54b to a driving pulley 56b included in the continuously variable transmission mechanism 56.

Between the two oil passages 22, 50, a check valve 58 and the second pump 30 are connected in parallel. The check valve 58 is a non-return valve provided to bypass the second pump 30, and allows the oil (first oil) to flow from the oil passage 22 disposed upstream to the oil passage 50 disposed downstream, and prevents the oil (second oil) from flowing from the oil passage 50 disposed downstream to the oil passage 22 disposed upstream.

A line pressure sensor 60 is disposed in the oil passage 50. The line pressure sensor 60 is a hydraulic sensor that sequentially detects a pressure (line pressure) PH of the oil flowing in the oil passage 50, and sequentially outputs the detection signal expressing the detected line pressure PH to the control unit 28. In the present embodiment, the line pressure sensor 60 is not an essential component. That is to say, in the present embodiment, it is only necessary that at least one hydraulic sensor of the output pressure sensor 26 and the line pressure sensor 60 is disposed. In the oil passage 54a, a lateral pressure sensor 62 as the hydraulic sensor is disposed. The lateral pressure sensor 62 detects a pressure PDN of the oil to be supplied to the driven pulley 56a (pulley pressure corresponding to the lateral pressure of the driven pulley 56a).

A CR valve 64 is connected to the downstream side in an oil passage 50c that is branched from the oil passage 50. The upstream side of the CR valve 64 is connected to the oil passage 50c, and the downstream side of the CR valve 64 is connected to two control valves 68a, 68b, a CPC valve 70, and an LCC valve 72 through an oil passage 66. The CR valve 64 is a reducing valve. The CR valve 64 reduces the pressure of the oil (second oil) supplied from the oil passage 50c, and supplies the oil with the reduced pressure to the control valves 68a, 68b, the CPC valve 70, and the LCC valve 72 through the oil passage 66.

Each of the control valves 68a, 68b is a normally open electromagnetic valve with a solenoid. The control valves 68a, 68b are closed while the control signal (current signal) is supplied from the control unit 28 and current flows in the solenoid, and on the other hand, the control valves 68a, 68b are open while current does not flow in the solenoid.

Figure 2:
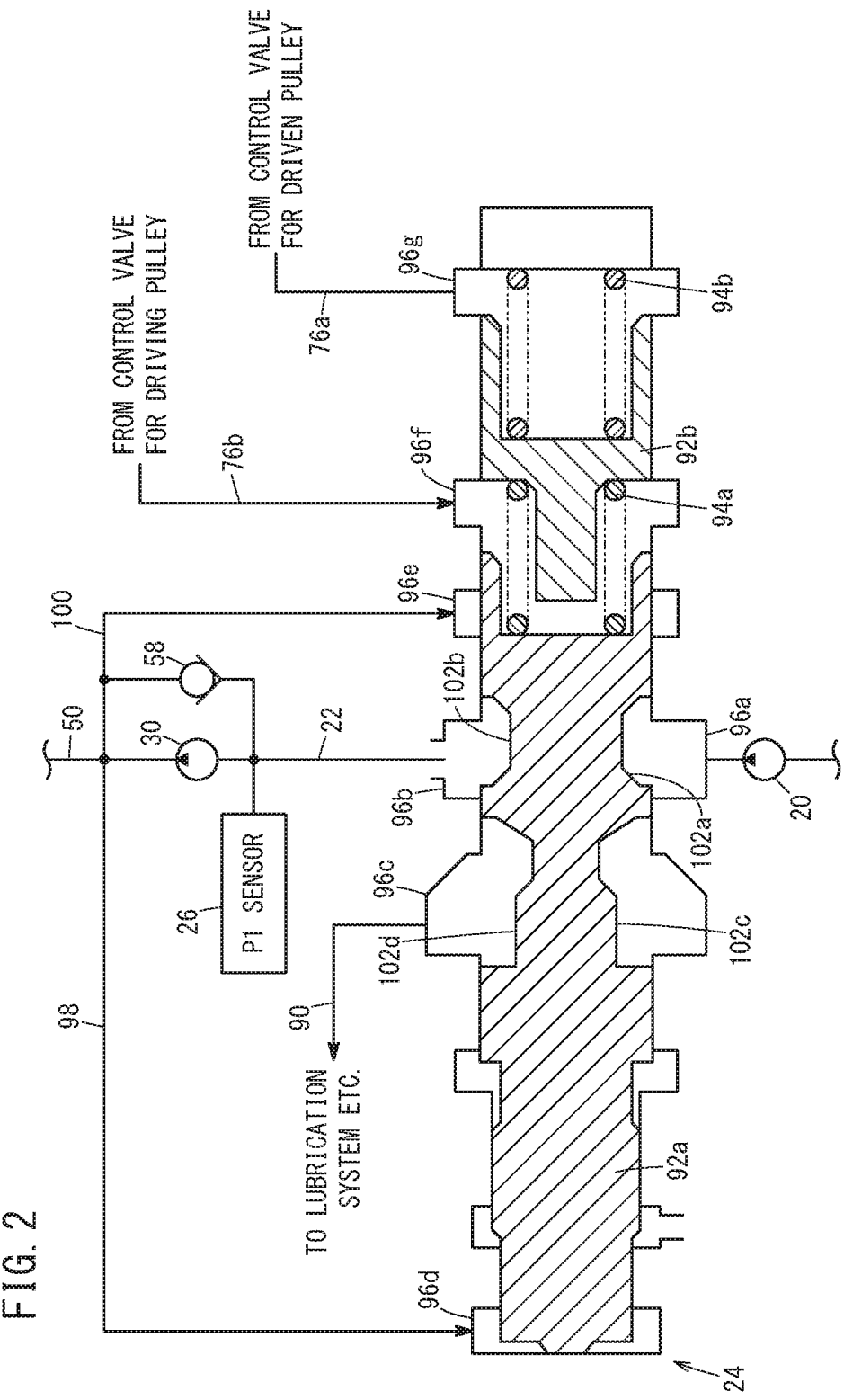
FIG. 2 is a structure diagram of a line pressure regulation valve in FIG. 1.

The one control valve 68a is a solenoid valve for the driven pulley 56a, and when the valve is open, the oil supplied from the CR valve 64 through the oil passage 66 is supplied to the regulator valve 52a through an oil passage 74a, and moreover supplied to the line pressure regulation valve 24 through an oil passage 76a (see FIG. 2). Note that the illustration of the oil passage 76a is omitted in FIG. 1 for convenience.

The other control valve 68b is a solenoid valve for the driving pulley 56b, and when the valve is open, the oil supplied from the CR valve 64 through the oil passage 66 is supplied to the regulator valve 52b through an oil passage 74b and moreover supplied to the line pressure regulation valve 24 through an oil passage 76b (see FIG. 2). Note that the illustration of the oil passage 76b is also omitted in FIG. 1 for convenience.

Therefore, one regulator valve 52a uses the pressure of the oil supplied from the control valve 68a through the oil passage 74a, as a pilot pressure. If the line pressure PH of the oil supplied through the oil passages 50, 50a is more than or equal to a predetermined pressure, the regulator valve 52a is open to supply the oil to the driven pulley 56a through the oil passage 54a. In addition, the other regulator valve 52b uses the pressure of the oil supplied from the control valve 68b through the oil passage 74b, as the pilot pressure. If the line pressure PH of the oil supplied through the oil passages 50, 50b is more than or equal to the predetermined pressure, the regulator valve 52b is open to supply the oil to the driving pulley 56b through the oil passage 54b.

The control valve 68a can regulate the pressure of the oil output to the oil passages 74a, 76a. The control valve 68b can regulate the pressure of the oil output to the oil passages 74b, 76b.

The upstream side of the CPC valve 70 is connected to the oil passage 66, and the downstream side of the CPC valve 70 is connected to a manual valve 80 through an oil passage 78. The CPC valve 70 is a solenoid valve for a forward clutch 82a and a reverse brake clutch 82b. In this case, while the control signal is supplied from the control unit 28 to make current flow in the solenoid, the CPC valve 70 is open to connect the oil passages 66, 78 to each other and thus, the oil is supplied to the manual valve 80.

The upstream side of the manual valve 80 is connected to the oil passage 78, and the downstream side thereof is connected to the forward clutch 82a through an oil passage 84a and moreover connected to the reverse brake clutch 82b through an oil passage 84b. The manual valve 80 is a spool valve. When a driver operates a range selector 86 provided near a driver's seat in the vehicle 14 to select any one of shift ranges such as P (parking), R (reverse), N (neutral), and D (forward, drive), the spool that is not shown is moved by a predetermined amount in an axial direction in accordance with the selected shift range. Thus, the manual valve 80 supplies the oil that is supplied through the oil passage 78, to the forward clutch 82a through the oil passage 84a, so that the vehicle 14 can travel in a forward direction. Alternatively, the manual valve 80 supplies the oil that is supplied through the oil passage 78, to the reverse brake clutch 82b through the oil passage 84b, so that the vehicle 14 can travel in a reverse direction. In the middle of the oil passage 84a, a clutch pressure sensor 88 is provided. The clutch pressure sensor 88 detects the pressure of the oil supplied to the oil passage 84a (clutch pressure).

To an oil passage 90 branched from the oil passage 22 through the line pressure regulation valve 24, a hydraulic operation unit of a low-pressure system is connected. To the hydraulic operation unit, the first oil is supplied through the oil passage 90. Here, before the description of the hydraulic operation unit of the low-pressure system, the structure of the line pressure regulation valve 24 is described with reference to FIG. 2.

The line pressure regulation valve 24 is a spool value incorporating a first spool 92a and a second spool 92b. The first spool 92a is a relatively long valve body and a cross section thereof is shaped like a letter of I. The first spool 92a is disposed along an axial direction (left-right direction in FIG. 2) inside the line pressure regulation valve 24. The second spool 92b is a spool that is shorter than the first spool 92a, and a cross section thereof is shaped like a letter of Y. The second spool 92b is disposed along the axial direction inside the line pressure regulation valve 24 on the right side of the first spool 92a. In this case, between the first spool 92a and the second spool 92b, a first elastic member 94a is inserted. The first elastic member 94a energizes the first spool 92a in a left direction in FIG. 2. The second spool 92b is energized toward the first spool 92a by a second elastic member 94b that is disposed on the right side of the second spool 92b.

The line pressure regulation valve 24 includes a first port 96a to a seventh port 96g. The first port 96a and the second port 96b are provided at a central part of an outer peripheral surface of the line pressure regulation valve 24 so as to face each other. Regardless of a position of the first spool 92a, the first port 96a and the second port 96b are connected to each other by, for example, a groove (not shown) formed around the axis on an inner peripheral surface side of the line pressure regulation valve 24. The first port 96a and the second port 96b constitute a part of the oil passage 22. In this case, the first port 96a is an inlet port in the line pressure regulation valve 24 where the first oil enters, and the second port 96b is an outlet port where the first oil exits.

Then, assuming that the position of the second port 96b on the outer peripheral surface of the line pressure regulation valve 24 is a center, the third port 96c and the fourth port 96d are provided in order on the left side in FIG. 2 so as to separate from the second port 96b, and on the other hand, on the right side in FIG. 2, the fifth port 96e to the seventh port 96g are provided in order so as to separate from the second port 96b.

The third port 96c is provided adjacently on the left side of the second port 96b, and is connected to the oil passage 90. The fourth port 96d is provided at a left end of the line pressure regulation valve 24, and is connected to the oil passage 50 through an oil passage 98. The fifth port 96e is provided adjacently on the right side of the second port 96b, and is connected to the oil passage 50 through an oil passage 100. Note that the illustration of the oil passages 98, 100 is omitted in FIG. 1 for convenience. The sixth port 96f is provided on the right side of the fifth port 96e, and is connected to the oil passage 76b. The seventh port 96g is provided at a right end of the line pressure regulation valve 24, and is connected to the oil passage 76a.

Therefore, to the fourth port 96d and the fifth port 96e, the oil (first oil or the second oil) with the line pressure PH that flows in the oil passage 50 is supplied through the oil passages 98, 100, respectively. To the sixth port 96f, the oil is supplied from the control valve 68b through the oil passage 76b. In addition, to the seventh port 96g, the oil is supplied from the control valve 68a through the oil passage 76a.

A groove is formed around the axis in a part of the outer peripheral surface of the first spool 92a that faces the first port 96a and the second port 96b. Thus, the part that faces the first port 96a is formed as a concave part 102a and the part that faces the second port 96b is formed as a concave part 102b. In addition, a groove is formed around the axis in a part of the outer peripheral surface of the first spool 92a that faces the third port 96c. Thus, a concave part 102c is formed adjacent to the concave part 102a and a concave part 102d is formed adjacent to the concave part 102b.

In the line pressure regulation valve 24, the pressure of the oil (line pressure PH, output pressure P1) supplied to the fourth port 96d is higher than the pressure of the oil supplied to the sixth port 96f and the seventh port 96g. However, since the area of the valve that is in contact with the oil is different, the pressure is balanced. When the oil with the pressure higher than the balanced point is supplied to the fourth port 96d, the first spool 92a shifts in the right direction in FIG. 2 by the line pressure PH against the elastic force of the first elastic member 94a and the pressure of the oil supplied to the sixth port 96f. Thus, the concave part 102c and the first port 96a are connected to each other so that the first oil can flow in the oil passage 90 through the first port 96a, the concave parts 102c, 102d, and the third port 96c. Note that in the line pressure regulation valve 24, the pressure of the first oil flowing in the oil passage 90 may be lower than the output pressure P1 of the first oil that flows to the second pump 30 and the check valve 58 through the oil passage 22. Therefore, in the description below, the first oil that flows in the oil passage 90 may be referred to as third oil.

Back to FIG. 1, a TC regulator valve 104, an oil warmer 106, and a lubrication system 108 for the transmission 12 are connected to the downstream side of the oil passage 90. The TC regulator valve 104 is connected to the LCC valve 72 through an oil passage 110, and the downstream side of the TC regulator valve 104 is connected to a torque converter 114 incorporating a lockup clutch 112.

The LCC valve 72 is a solenoid valve for the lockup clutch 112. While the control signal is supplied from the control unit 28 to make current flow in the solenoid, the LCC valve 72 is open to connect the oil passages 66, 110 to each other, and thus the oil is supplied to the TC regulator valve 104. The TC regulator valve 104 is a spool valve. When the spool that is not shown is operated in the axial direction in accordance with the pressure of the oil supplied from the LCC valve 72 through the oil passage 110, the pressure of the third oil supplied through the oil passage 90 is reduced and the third oil with the reduced pressure is supplied to the torque converter 114 and the lockup clutch 112.

The oil warmer 106 warms up the third oil supplied from the oil passage 90 to a predetermined temperature, and supplies the third oil that is warmed to a pulley shaft 56c, a bearing 56d, and a belt 56e included in the continuously variable transmission mechanism 56. The lubrication system 108 lubricates various components such as a bearing and a gear in the transmission 12.

The hydraulic control device 10 further includes an engine rotation number sensor 116, an oil temperature sensor 118, a vehicle speed sensor 120, an acceleration sensor 122, and the control unit 28. The engine rotation number sensor 116 sequentially detects the engine rotation number New of the engine 16 in accordance with the rotation number Nmp of the first pump 20, and sequentially outputs the detection signal expressing the detected engine rotation number New (rotation number Nmp) to the control unit 28. The oil temperature sensor 118 sequentially detects a temperature (oil temperature) To of the first oil or the second oil, and sequentially outputs the detection signal expressing the detected oil temperature To to the control unit 28. The vehicle speed sensor 120 sequentially detects a vehicle speed Vs of the vehicle 14, and sequentially outputs the detection signal expressing the detected vehicle speed Vs to the control unit 28. The accelerator sensor 122 sequentially detects the opening of an accelerator pedal (not shown) that is operated by the driver, and sequentially outputs the detection signal expressing the detected opening to the control unit 28.

The control unit 28 is a microcomputer such as a CPU functioning as a transmission control unit (TCU) that controls the transmission 12 or an engine control unit (ECU) that controls the engine 16. The control unit 28 achieves functions of a vehicle state grasping unit 28a, a line pressure estimation unit (second hydraulic pressure estimation unit)

Figure 3:
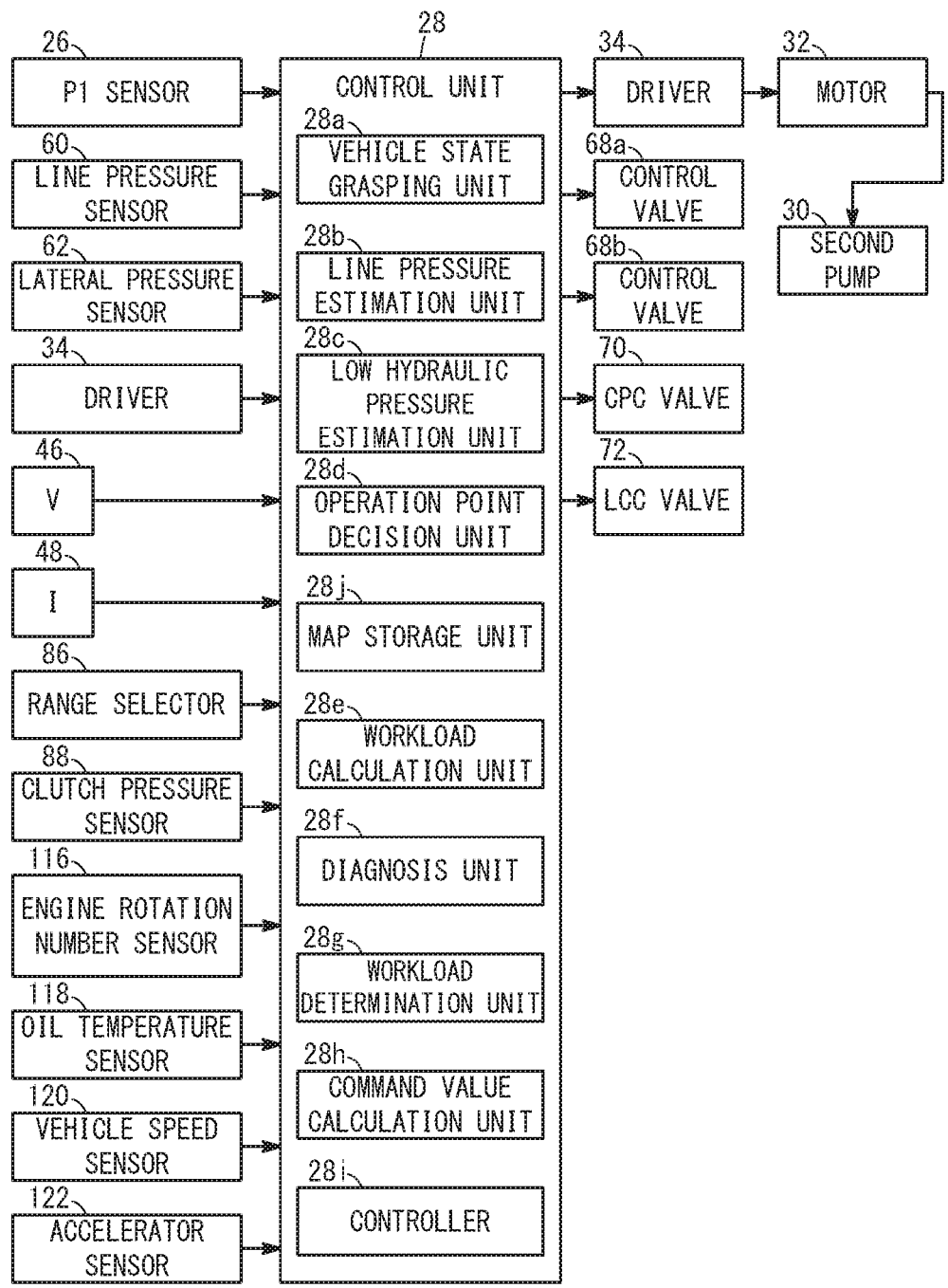
FIG. 3 is a block diagram of a control unit in FIG. 1.

28*b*, a low hydraulic pressure estimation unit (first hydraulic pressure estimation unit) 28*c*, an operation point decision unit 28*d*, a workload calculation unit 28*e*, a diagnosis unit 28*f*, a workload determination unit 28*g*, a command value calculation unit 28*h*, and a controller 28*i* as illustrated in FIG. 3 by reading and executing programs stored in a storage unit that is not shown.

The vehicle state grasping unit 28*a* grasps a vehicle state of the vehicle 14 (for example, a vehicle travel state of the vehicle 14) on the basis of detection results from the above sensors. The vehicle state includes a hydraulic control state by the hydraulic control device 10.

The line pressure estimation unit 28*b* estimates the line pressure PH with reference to various maps stored in a map storage unit 28*j* by using a current value IDN corresponding to the control signal to be supplied to the solenoid of the control valve 68*a* and a current value IDR corresponding to the control signal to be supplied to the solenoid of the control valve 68*b*. Note that the details of the maps stored in the map storage unit 28*j* will be described below.

The low hydraulic pressure estimation unit 28*c* estimates a pressure (low hydraulic pressure) P3 of the third oil to be supplied to the TC regulator valve 104, the oil warmer 106, and the lubrication system 108 through the oil passage 90 with reference to the maps based on the components of the hydraulic system in the transmission 12 that are stored in the map storage unit 28*j*.

The operation point decision unit 28*d* decides the operation point of the second pump 30 on the basis of a differential pressure ΔP between the line pressure PH and the output pressure P1 or the pressure P3 (ΔP=PH−P1 or ΔP=PH−P3), and a necessary flow rate Q corresponding to a request output for the second pump 30 (requested discharging amount of the oil that should be discharged from the second pump 30).

The workload calculation unit 28*e* calculates the workload to be cut in the first pump 20 (amount of workload cut) when supply of the first oil from the first pump 20 to the continuously variable transmission mechanism 56 through the check valve 58 is switched to supply of the second oil from the second pump 30 to the continuously variable transmission mechanism 56.

Note that the switch between the first oil and the second oil with respect to the continuously variable transmission mechanism 56 is performed by opening or closing the check valve 58. That is to say, when the amount of discharging (flow rate) of the second oil from the second pump 30 exceeds the flow rate of the first oil (amount of discharging first oil from the first pump 20) that passes the check valve 58, the pressure of the oil (line pressure PH) on the oil passage 50 side in the check valve 58 becomes higher than the pressure of the oil (output pressure P1) on the oil passage 22 side. Thus, the check valve 58 is closed and the supply of the first oil from the first pump 20 to the continuously variable transmission mechanism 56 or the like through the check valve 58 and the oil passage 50 is switched to the supply of the second oil from the second pump 30 to the continuously variable transmission mechanism 56 or the like through the oil passage 50. As a result, the flow of the first oil to the oil passage 50 is stopped and the second pump 30 transfers the second oil with pressure to the continuously variable transmission mechanism 56 or the like. In a case where the discharging amount of the second pump 30 is reduced due to the stop or the low-rotation state of the second pump 30, for example, the check valve 58 is opened to supply the first oil to the continuously variable transmission mechanism 56.

The diagnosis unit 28*f* diagnoses the state of each part of the vehicle 14 including the hydraulic control device 10 and the transmission 12 on the basis of the detection results from the above sensors and the driver's intention (for example, driver's operation on accelerator pedal). The workload determination unit 28*g* determines whether the amount of workload loss based on the amount of power generated by the ACG 40 (the workload of generating power by the ACG 40) is more than the amount of workload cut.

The command value calculation unit 28*h* calculates a command value for the motor 32 that drives the second pump 30 on the basis of the operation point of the second pump 30 that is decided by the operation point decision unit 28*d* and a determination result in the workload determination unit 28*g*. The controller 28*i* generates the control signal based on the command value calculated by the command value calculation unit 28*h* and outputs the control signal to the driver 34.

Since the transmission 12 as a continuously variable transmission is well known, the detailed description thereof is omitted.

2. Operation of the Present Embodiment

An operation of the hydraulic control device 10 according to the present embodiment with the above structure will be described with reference to FIG. 4A to FIG. 13. Here, the description is mainly given concerning a case in which the driving of the second pump 30 is controlled optimally in a manner that the control unit 28 performs a feedback control for the motor 32 by using the output pressure P1 detected by the output pressure sensor 26 or the line pressure PH detected by the line pressure sensor 60. Here, the description is given with reference to FIG. 1 to FIG. 3 as necessary.

<2. 1 Basic Operation of Hydraulic Control Device 10>

Before the description of the operation of the above feedback control, a basic operation of the hydraulic control device 10 is described. The basic operation to be described here mainly is the operation of the hydraulic system that supplies the oil from the reservoir 18 to the continuously variable transmission mechanism 56 through the first pump 20 or the like.

First, when the driving of the first pump 20 is started by the driving of the engine 16, the first pump 20 pumps up the oil of the reservoir 18 and starts to transfer the pumped oil with pressure as the first oil. Thus, the first oil flows in the oil passage 22 through the first port 96*a* and the second port 96*b*. The output pressure sensor 26 sequentially detects the pressure (output pressure) P1 of the first oil flowing in the oil passage 22, and outputs the signal expressing the detection result to the control unit 28. The engine rotation number sensor 116 sequentially detects the engine rotation number New, and sequentially outputs the signal expressing the detection result to the control unit 28.

Figure 4B:
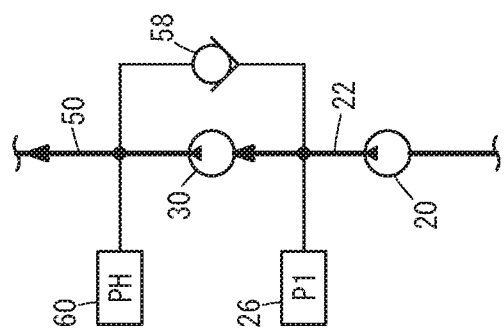
FIG. 4B is an explanatory diagram illustrating a case in which oil is supplied from a second pump to the continuously variable transmission mechanism.
Figure 4A:
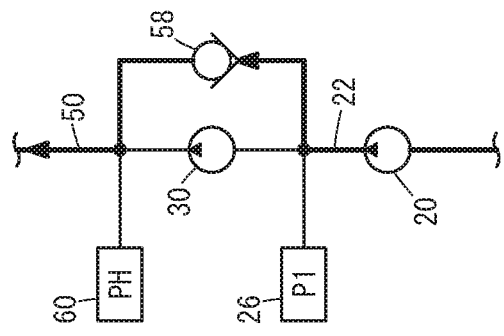
FIG. 4A is an explanatory diagram illustrating a case in which oil is supplied from a first pump to a continuously variable transmission mechanism through a check valve.

In this case, since the motor 32 is not driven, the first oil flowing in the oil passage 22 flows to the oil passage 50 through the check valve 58 along a thick line as schematically illustrated in FIG. 4A. Thus, the first oil is supplied to the fourth port 96*d* through the oil passages 50, 98, supplied to the fifth port 96*e* through the oil passages 50, 100, and supplied to the CR valve 64 through the oil passages 50, 50*c*. The CR valve 64 reduces the pressure of the first oil that is supplied, and supplies the first oil with the reduced pressure to the control valves 68*a*, 68*b* through the oil passage 66. In addition, the line pressure sensor 60 sequentially detects the pressure of the first oil (line pressure PH) flowing in the oil passage 50, and sequentially outputs the signal expressing the detection result to the control unit 28.

Here, the control signals (current values IDN, IDR) are supplied in advance from the control unit 28 to the solenoids of the control valves 68a, 68b, and the control valves 68a, 68b are in a closed state. Then, by stopping the supply of the control signal to each solenoid, the control valves 68a, 68b are switched from the closed state to an open state. Thus, the control valve 68a supplies the oil to the regulator valve 52a through the oil passage 74a, and supplies the oil to the seventh port 96g through the oil passage 76a. In addition, the control valve 68b supplies the oil to the regulator valve 52b through the oil passage 74b, and supplies the oil to the sixth port 96f through the oil passage 76b.

The regulator valve 52a uses the pressure of the oil supplied through the oil passage 74a, as the pilot pressure. If the pressure of the first oil is more than or equal to a predetermined pressure, the regulator valve 52a is opened to supply the first oil to the driven pulley 56a through the oil passage 54a. The lateral pressure sensor 62 sequentially detects the pressure of the first oil supplied to the driven pulley 56a (pulley pressure PDN also functioning as the lateral pressure), and sequentially outputs the signal expressing the detection result to the control unit 28.

On the other hand, the regulator valve 52b uses the pressure of the oil supplied through the oil passage 74b, as the pilot pressure. If the pressure of the first oil (line pressure PH) is more than or equal to the predetermined pressure, the regulator valve 52b is opened to supply the first oil to the driving pulley 56b through the oil passage 54b.

Note that in the line pressure regulation valve 24, the first oil is supplied to the fourth port 96d, the oil is supplied from the control valve 68b to the sixth port 96f, and the oil is supplied from the control valve 68a to the seventh port 96g. In this case, the pressure of the first oil (line pressure PH, output pressure P1) is higher than the pressure of the oil from each control valve 68a, 68b; therefore, the first spool 92a shifts in the right direction in FIG. 2 by the line pressure PH against the elastic force of the first elastic member 94a and the pressure of the oil. Thus, the concave part 102c and the first port 96a are connected so that the first oil can be supplied as the third oil to the low-pressure system such as the lubrication system 108 through the first port 96a, the concave parts 102c, 102d, the third port 96c, and the oil passage 90.

In this manner, when the control signal is supplied from the control unit 28 (controller 28i thereof) to the driver 34 in a state that the first pump 20 is driven, the driver 34 drives the motor 32 on the basis of the control signal and drives the second pump 30. Thus, the second pump 30 outputs the first oil that flows in the oil passage 22, as the second oil.

Then, when the second oil flows in the oil passage 50 and the flow rate of the second oil (discharging flow rate of the second pump 30) exceeds the flow rate of the first oil (discharging flow rate of the first pump 20), the pressure of the oil (line pressure PH) on the oil passage 50 side becomes higher than the pressure of the oil (output pressure P1) on the oil passage 22 side in the check valve 58. Thus, the check valve 58 is closed and the supply of the first oil from the first pump 20 to the continuously variable transmission mechanism 56 or the like through the check valve 58 and the oil passage 50 in FIG. 4A is switched to the supply of the second oil from the second pump 30 to the continuously variable transmission mechanism 56 or the like through the oil passage 50 as shown by a thick line in FIG. 4B. As a result, the flow of the first oil to the oil passage 50 is stopped, and the second pump 30 transfers the second oil with pressure to the continuously variable transmission mechanism 56 or the like. The second oil is supplied to the fourth port 96d through the oil passages 50, 98, supplied to the fifth port 96e through the oil passages 50, 100, and supplied to the CR valve 64. Note that the driver 34 sequentially outputs the signal expressing the motor rotation number Nem of the motor 32 (rotation number Nep of the second pump 30) to the control unit 28.

The CR valve 64 reduces the pressure of the second oil that is supplied, and supplies the second oil with the reduced pressure to the control valves 68a, 68b through the oil passage 66. Since the control valve 68a is open, the oil is supplied to the regulator valve 52a through the oil passage 74a and the oil is supplied to the seventh port 96g through the oil passage 76a. In addition, since the control valve 68b is open, the oil is supplied to the regulator valve 52b through the oil passage 74b and the oil is supplied to the sixth port 96f through the oil passage 76b.

As a result, the regulator valve 52a uses the pressure of the oil supplied through the oil passage 74a, as the pilot pressure and supplies the second oil to the driven pulley 56a. The lateral pressure sensor 62 sequentially detects the pressure of the second oil supplied to the driven pulley 56a (lateral pressure PDN), and outputs the detected pressure to the control unit 28. On the other hand, the regulator valve 52b uses the pressure of the oil supplied through the oil passage 74b, as the pilot pressure and supplies the second oil to the driving pulley 56b.

Thus, since the second oil that is pressurized (PH>P1) is supplied to the driven pulley 56a and the driving pulley 56b, the pressure (output pressure) P1 of the first oil can be reduced so as to reduce the burden on the first pump 20. In this case, by using the pressure of the second oil (line pressure PH) supplied to the fourth port 96d of the line pressure regulation valve 24 as the pilot pressure, the first spool 92a shifts in the right direction in FIG. 2 so that an opening (opening area) between the first port 96a and the concave part 102c becomes large. Thus, the output pressure P1 can be reduced.

In the line pressure regulation valve 24, the oil is supplied to the sixth port 96f and the seventh port 96g. In this case, since the line pressure PH is higher than the pressure of the oil, the first spool 92a shifts further in the right direction in FIG. 2 against the elastic force of the first elastic member 94a and the pressure of the oil. Thus, the concave part 102b and the fifth port 96e are connected to each other so as to connect between the oil passage 22 and the oil passage 100. As a result, the increase in pressure of the second oil (line pressure PH) to be supplied to the oil passage 100 can be suppressed, and the line pressure PH can be maintained to the predetermined pressure.

Figure 5:
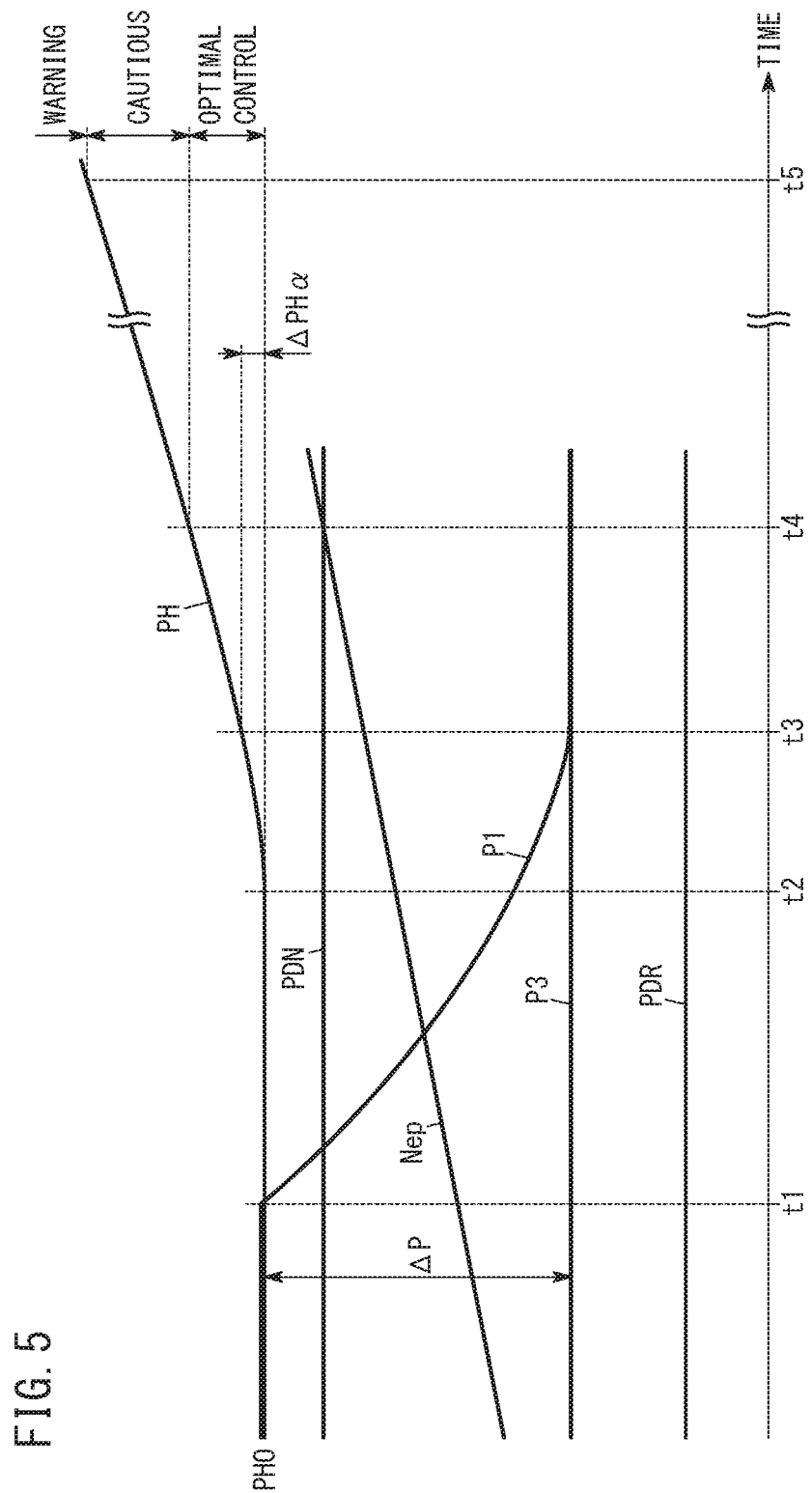
FIG. 5 is a timing chart expressing an operation of the hydraulic control device in FIG. 1.

<2. 2 Description of FIG. 5>

FIG. 5 is a timing chart in which the supply of the oil to the continuously variable transmission mechanism 56 through the oil passage 50 (see FIG. 1 and FIG. 2) is switched from the supply of the first oil from the first pump 20 through the check valve 58 to the supply of the second oil from the second pump 30. In FIG. 5, PDR indicates the pressure of the oil (lateral pressure, pulley pressure) supplied to the driving pulley 56b through the oil passage 50b.

In a time band before a time point t1, the first oil is supplied from the first pump 20 to the continuously variable transmission mechanism 56 through the check valve 58 and the oil passage 50. Therefore, the pressure of the first oil flowing in the oil passage 50 is a relatively high hydraulic pressure, and P1>PH (PH0) is satisfied. The pressure P3 of the third oil is lower than the line pressure PH and the output pressure P1 (PH>P3, P1>P3). The pressure of the oil (lateral pressure PDN) to be supplied to the driven pulley 56a is a little lower than the line pressure PH. This is because the flow rate of the oil to be supplied to the driven pulley 56a becomes a little lower due to, for example, leak in the hydraulic system from the oil passage 50 to the driven pulley 56a.

Here, the control unit 28 of the hydraulic control device 10 controls the second pump 30 and the like so that the lateral pressure PDN of the driven pulley 56a, the lateral pressure PDR of the driving pulley 56b, and the pressure P3 of the third oil maintain fixed values even after the time elapses. On the other hand, the control unit 28 controls the motor 32 through the driver 34 so that the rotation number Nep of the second pump 30 (torque of the second pump 30) increases as the time elapses. As a result, the flow rate of the second oil that is discharged from the second pump 30 gradually increases as the rotation number Nep of the second pump 30 increases.

Then, when the discharging flow rate of the second oil from the second pump 30 exceeds the flow rate of the first oil to be supplied from the first pump 20 through the oil passage 22 at the time point t1, the check valve 58 is closed. Thus, the supply of the first oil from the first pump 20 to the continuously variable transmission mechanism 56 through the check valve 58 and the oil passage 50 (see FIG. 4A) is switched to the supply of the second oil from the second pump 30 to the continuously variable transmission mechanism 56 through the oil passage 50 (see FIG. 4B). Therefore, the pressure of the second oil becomes the line pressure PH after the time point t1. As a result, after the time point t1, the output pressure P1 can be reduced gradually as the time elapses.

The line pressure PH is maintained at PH0 corresponding to the predetermined pressure until a time point t2, and after the time point t2, the line pressure PH gradually increases as the time elapses. After that, the output pressure P1 decreases to the pressure P3 of the third oil at a time point t3 (P1≈P3) and then, the output pressure P1 is maintained at the pressure P3. Therefore, the time point t3 at which the output pressure P1 has decreased to the lowest pressure P3 is an operation point of the second pump 30 that is optimal (optimal operation point). Therefore, the control unit 28 controls the driving of the second pump 30 assuming that the value of the line pressure PH at this optimal operation point is an optimal target value. Note that since the output pressure P1 is the lowest at the optical operation point, the workload of the first pump 20 is cut and the fuel efficiency of the vehicle 14 is expected to improve. In addition, the line pressure PH at the optimal operation point includes the line pressure PH0 with a fixed value until the time point t2 and a pressure value ΔPHα where a pressure loss and the like in the hydraulic system to the continuously variable transmission mechanism 56 are also taken into consideration (PH=PH0+ΔPHα).

Even after the time point t3, as the rotation number Nep of the second pump 30 increases, the line pressure PH also increases along with the time elapse. That is to say, the control unit 28 generates the control signal in accordance with the request output based on the lateral pressure PDN or the like, and rotates the motor 32 through the driver 34; thus, the second pump 30 is rotated. In this case, as the rotation number Nep of the second pump 30 is increased in accordance with the request output, the operation status (line pressure PH) of the second pump 30 sequentially shifts from an optimal control zone including the optimal operation point to a cautious zone and a warning zone.

The optimal control zone is a region of the optimal line pressure PH, in which the workload of the first pump 20 is cut and the fuel efficiency of the vehicle 14 can be improved due to the rotation of the second pump 30. The cautious zone is a region of the line pressure PH higher than that in the optimal control zone. In the cautious zone, it is difficult to improve the fuel efficiency. Moreover, the warning zone is a region of the line pressure PH higher than that in the cautious zone. In the warning zone, it is difficult to improve the fuel efficiency and it is necessary to avoid the supply of the oil to the continuously variable transmission mechanism 56.

<2. 3 Description of FIG. 6>

Specifically, as illustrated in FIG. 6, the following problem occurs depending on the command value (command rotation number) of the rotation number Nep of the second pump 30.

That is to say, in the cautious zone in which the command rotation number is higher than that in the optimal control zone including the optimal operation point, the second pump 30 is rotated at the rotation number Nep that is excessive, so that the pressure of the second oil (line pressure PH) to be supplied to the continuously variable transmission mechanism 56 becomes an excessive hydraulic value. When the oil supply in this state is switched to the oil supply by the first pump 20, a hydraulic response delay occurs in the driven pulley 56a and the driving pulley 56b. Due to this hydraulic response delay, the hydraulic pressure (lateral pressure PDN, PDR) in the driven pulley 56a and the driving pulley 56b may decrease.

In the warning zone in which the command rotation number is higher than that in the cautious zone, the line pressure PH becomes much higher. Therefore, when the oil supply in this state is switched to the oil supply by the first pump 20, the decrease in lateral pressure PDN, PDR due to the hydraulic response delay becomes more remarkable, and in this case, the clutch pressure may be insufficient.

In addition, in the cautious zone and the warning zone, the second pump 30 is rotated at the excessive rotation number Nep; thus, the second pump 30 and the motor 32 consume power wastefully. As a result, even if the workload of the first pump 20 is reduced by driving the second pump 30 in order to improve the fuel efficiency of the vehicle 14, the fuel efficiency of the vehicle 14 may deteriorate.

On the other hand, in a region where the command rotation number is lower than that in the optimal control zone, the first pump 20 and the second pump 30 are driven together; therefore, hunting, that is, repeated opening and closing of the check valve 58 occur. As a result, the pressure of the oil (line pressure PH) to be supplied to the continuously variable transmission mechanism 56 through the oil passage 50 varies and the operation of the continuously variable transmission mechanism 56 is influenced. In addition, since the second pump 30 is driven in the low-rotation state, the effect of cutting the workload in the first pump 20 cannot be expected and the fuel efficiency of the vehicle 14 is deteriorated.

<2. 4 Characteristic Operation of the Present Embodiment>

For the above problem, the hydraulic control device 10 according to the present embodiment performs the feedback control for the motor 32 (second pump 30) using the output pressure P1 or the line pressure PH. Thus, the second pump 30 can be controlled optimally and the deterioration in fuel efficiency of the vehicle 14 and the hydraulic response delay can be suppressed. Such a control method will be described in detail with reference to FIG. 7 to FIG. 13.

Figure 7:
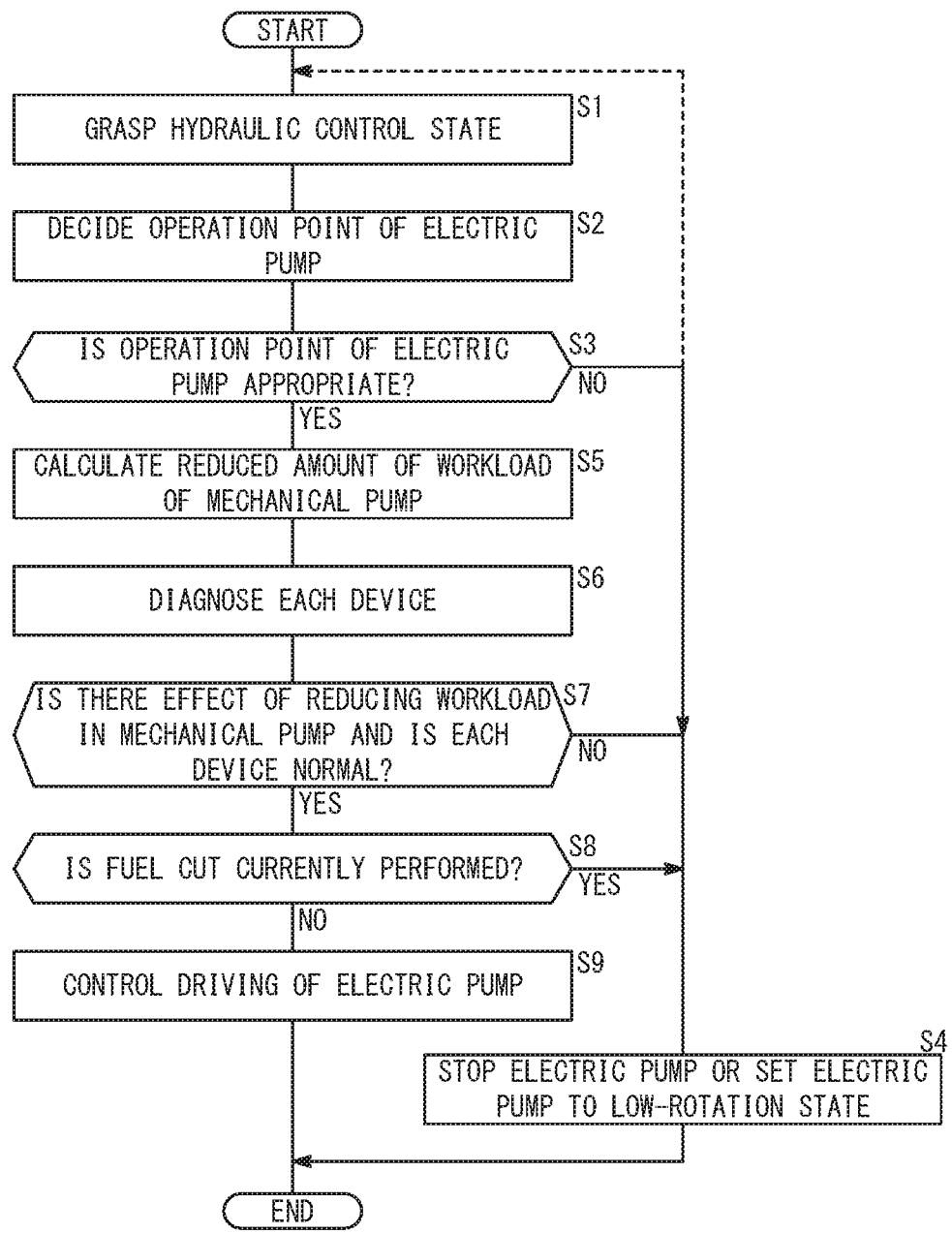
FIG. 7 is a flowchart expressing an operation of the hydraulic control device in FIG. 1.

FIG. 7 is a flowchart for describing a characteristic operation of the hydraulic control device 10. Note that the process in FIG. 7 is performed mainly by the control unit 28, and is repeated at predetermined time intervals.

In step S1 in FIG. 7, the vehicle state grasping unit 28a in the control unit 28 grasps various vehicle states of the vehicle 14 including the hydraulic control state regarding a hydraulic system in the transmission 12 on the basis of the detection signals that are sequentially input from various sensors in the vehicle 14 to the control unit 28.

Figure 8:
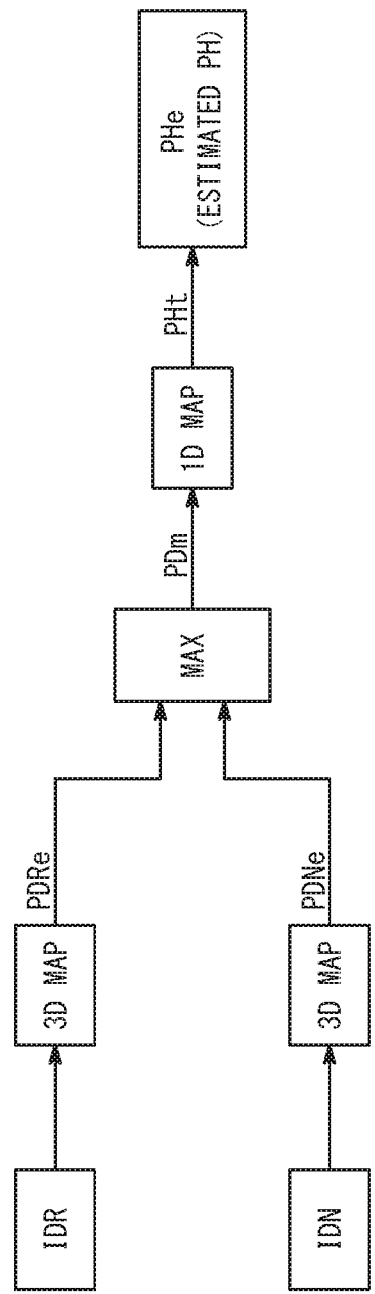
FIG. 8 is an explanatory diagram illustrating a process of estimating a line pressure in a line pressure estimation unit.

Next, using the lateral pressure (pulley pressure) PDN or the like as the command value, the line pressure estimation unit 28b estimates the line pressure PH (estimated line pressure PHe) based on the command value. FIG. 8 is an explanatory diagram illustrating an outline of a process of estimating the line pressure PH in the line pressure estimation unit 28b.

The lateral pressure PDN of the driven pulley 56a is the pressure of the oil to be supplied from the oil passage 50 to the driven pulley 56a through the oil passage 50a, the regulator valve 52a, and the oil passage 54a. The lateral pressure PDN can be regulated in accordance with the pressure of the oil (pilot pressure) to be supplied from the control valve 68a to the regulator valve 52a through the oil passage 74a. On the other hand, the lateral pressure PDR of the driving pulley 56b is the pressure of the oil to be supplied from the oil passage 50 to the driving pulley 56b through the oil passage 50b, the regulator valve 52b, and the oil passage 54b. The lateral pressure PDR can be regulated in accordance with the pressure of the oil (pilot pressure) to be supplied from the control valve 68b to the regulator valve 52b through the oil passage 74b.

In view of the above, the line pressure estimation unit 28b obtains the estimated value of the lateral pressure PDN (estimated lateral pressure PDNe as a command value) based on the control signal (current value IDN) to be supplied to the solenoid of the control valve 68a with reference to a 3D map stored in the map storage unit 28j. In addition, the line pressure estimation unit 28b obtains the estimated value of the lateral pressure PDR (estimated lateral pressure PDRe as a command value) based on the control signal (current value IDR) to be supplied to the solenoid of the control valve 68b with reference to another 3D map stored in the map storage unit 28j.

Each 3D map is a three-dimensional map expressing a relation between the current values IDN, IDR and the estimated lateral pressures PDNe, PDRe that are created for each oil temperature To of the first oil or the second oil. Therefore, the line pressure estimation unit 28b specifies the estimated lateral pressures PDNe, PDRe based on the current oil temperature To and current values IDN, IDR from the 3D map.

Next, the line pressure estimation unit 28b decides the higher hydraulic value of the specified two estimated lateral pressures PDNe, PDRe as a target lateral pressure PDm. Next, the line pressure estimation unit 28b specifies a target value PHt of the line pressure PH in accordance with the target lateral pressure PDm with reference to a 1D map stored in the map storage unit 28j. The 1D map is a one-dimensional map expressing a relation between the target lateral pressure PDm and the line pressure PH.

Finally, the line pressure estimation unit 28b decides as the estimated value of the line pressure PH (estimated line pressure PHe), the value obtained by adding a predetermined amount of margin to the target value PHt.

In addition, the map storage unit 28j stores a characteristic of each component in the hydraulic system of the transmission 12 as the map. Then, from a process result of the vehicle state grasping unit 28a, the low hydraulic pressure estimation unit 28c estimates the pressure P3 of the third oil (estimated value P3e) by using the map of the characteristic of each component stored in the map storage unit 28j.

Specifically, the low hydraulic pressure estimation unit 28c estimates a pressure PCR of the oil passing the CR valve 64 by using the estimated line pressure PHe and a current value ICPC of the control signal to be supplied to the CPC valve 70. In this case, the low hydraulic pressure estimation unit 28c obtains the pressure PCR for each temperature, and sets the characteristic of the obtained pressure PCR as the map in the map storage unit 28j.

Next, the low hydraulic pressure estimation unit 28c estimates a pressure PLCC of the oil that passes the TC regulator valve 104 by using the map of the pressure PCR and a current value ILCC of the control signal to be supplied to the solenoid of the LCC valve 72 with reference to the map storage unit 28j. The pressure PLCC is also the pressure of the oil to be supplied to the lockup clutch 112. In this case, the low hydraulic pressure estimation unit 28c obtains the pressure PLCC for each temperature, and sets the characteristic of the obtained pressure PLCC as the map in the map storage unit 28j.

Next, the low hydraulic pressure estimation unit 28c obtains the leak amount in a hydraulic route to the driven pulley 56a and the driving pulley 56b through the oil passages 50, 50a, 50b from the maps of the current values IDN, IDR and the lateral pressures PDN, PDR with reference to the map storage unit 28j. Moreover, the low hydraulic pressure estimation unit 28c obtains the leak amount in the LCC valve 72 from the map of the current value ILCC and obtains the leak amount in the CR valve 64 and the leak amount in the CPC valve 70 from the map of the current value ICPC.

In addition, the low hydraulic pressure estimation unit 28c calculates the flow rate of the second oil (flow rate for shift in the driven pulley 56a and the driving pulley 56b) to be supplied to the continuously variable transmission mechanism 56 during the shift operation on the basis of the areas of pulley chambers of the driven pulley 56a and the driving pulley 56b and the rotation numbers of the driven pulley 56a and the driving pulley 56b.

Then, with reference to the map storage unit 28j, the low hydraulic pressure estimation unit 28c calculates a flow rate QPH of the oil that should be supplied to a high-pressure hydraulic system from the second pump 30 to the driven pulley 56a and the driving pulley 56b by summing up the leak amount in the hydraulic route to the driven pulley 56a and the driving pulley 56b, the leak amount in the LCC valve 72, the leak amount in the CPC valve 70, the leak amount in the CR valve 64, the flow rate for shift, and the leak amount in the driven pulley 56a and the driving pulley 56b.

Next, the low hydraulic pressure estimation unit 28c calculates a flow rate Q3 of the third oil to be supplied to the low-pressure system through the oil passage 90 by subtracting the flow rate QPH from the discharging flow rate of the first oil from the first pump 20 with reference to the map storage unit 28j.

Next, the low hydraulic pressure estimation unit 28c estimates the pressure P3 (estimated value P3e) of the third oil based on the oil temperature To of the first oil or the second oil on the basis of the pressure PLCC of the oil that passes the TC regulator valve 104 and the flow rate Q3 of the third oil.

Figure 9:
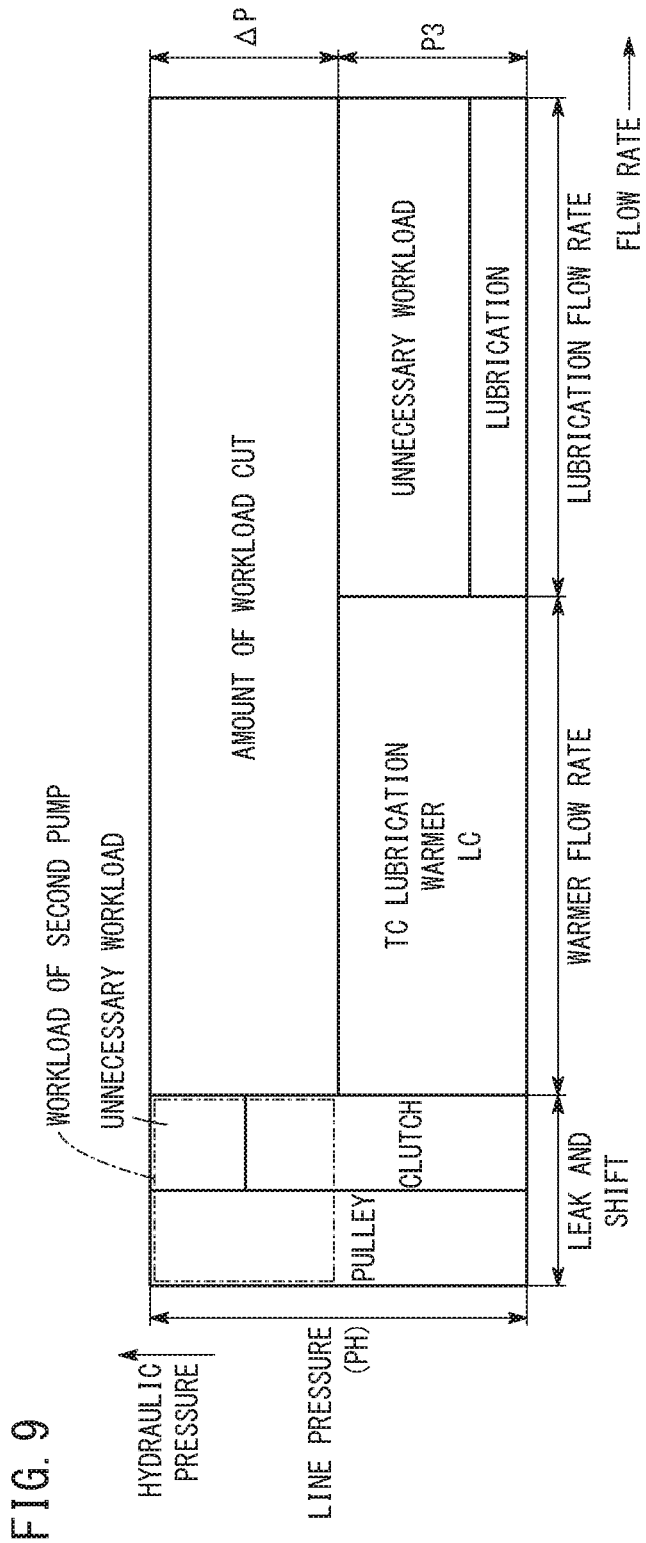
FIG. 9 is an explanatory diagram schematically illustrating workloads of the hydraulic control device in FIG. 1.

In the next step S2, first, the operation point decision unit 28d calculates the differential pressure ΔP (ΔP=PHe−P3) by subtracting the pressure P3 from the estimated line pressure PHe estimated by the line pressure estimation unit 28b. That is to say, if the second pump 30 supplies the second oil to the continuously variable transmission mechanism 56, it is necessary for the second pump 30 to pressurize the first oil with the pressure P3 up to the line pressure PH (estimated line pressure PHe) and to discharge the first oil that is pressurized as the second oil as illustrated in FIG. 9. Therefore, in order to decide the operation point of the second pump 30, the operation point decision unit 28d calculates a differential pressure ΔP between the estimated line pressure PHe and the pressure P3 as a request discharging pressure (request output) for the second pump 30. Note that it is desirable that the operation point decision unit 28d calculates the differential pressure ΔP by adding a margin pressure that can control the pulley pressure to the estimated line pressure PHe. The details of each workload in FIG. 9 will be described below.

Figure 10:
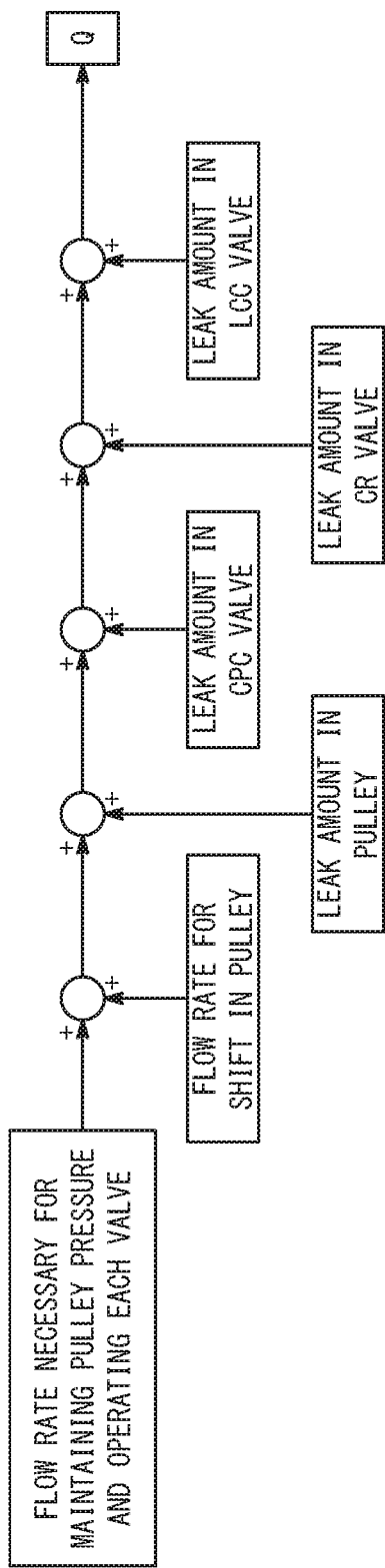
FIG. 10 is an explanatory diagram illustrating a method of calculating a necessary flow rate.

In step S2, the operation point decision unit 28d calculates a necessary flow rate Q as the request discharging amount (request output) that should be discharged from the second pump 30. FIG. 10 is an explanatory diagram illustrating a method of calculating the necessary flow rate Q in the operation point decision unit 28d.

The operation point decision unit 28d calculates the necessary flow rate Q by adding the flow rate for shift and the leak amount, that is, "FLOW RATE FOR SHIFT IN PULLEY", "LEAK AMOUNT IN PULLEY", "LEAK AMOUNT IN CPC VALVE", "LEAK AMOUNT IN CR VALVE", and "LEAK AMOUNT IN LCC VALVE" in FIG. 10 to the flow rate necessary to maintain each pulley pressure of the driven pulley 56a and the driving pulley 56b, and the flow rate necessary for the operation of each valve in the transmission 12. That is to say, in the case where the second pump 30 supplies the second oil to the continuously variable transmission mechanism 56 or the like, the operation point decision unit 28d calculates the necessary flow rate Q by summing up the flow rate of the second oil to be supplied to a supply target such as the continuously variable transmission mechanism 56 and the leak amount generated in a route in the middle of the supply.

Note that since these leak amounts are calculated in the low hydraulic pressure estimation unit 28c, the operation point decision unit 28d can calculate the necessary flow rate Q by using the calculation result in the low hydraulic pressure estimation unit 28c.

Figure 11A:
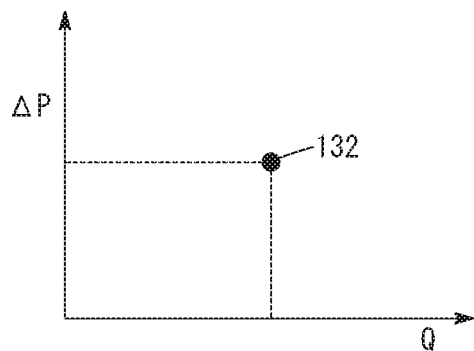
FIG. 11A is a diagram showing an operation point.

By using the differential pressure ΔP and the necessary flow rate Q that are obtained in this manner, the operation point decision unit 28d decides the operation point of the second pump 30. FIG. 11A shows a case in which a coordinate expressing the differential pressure ΔP and the necessary flow rate Q is decided as an operation point 132.

Figure 11B:
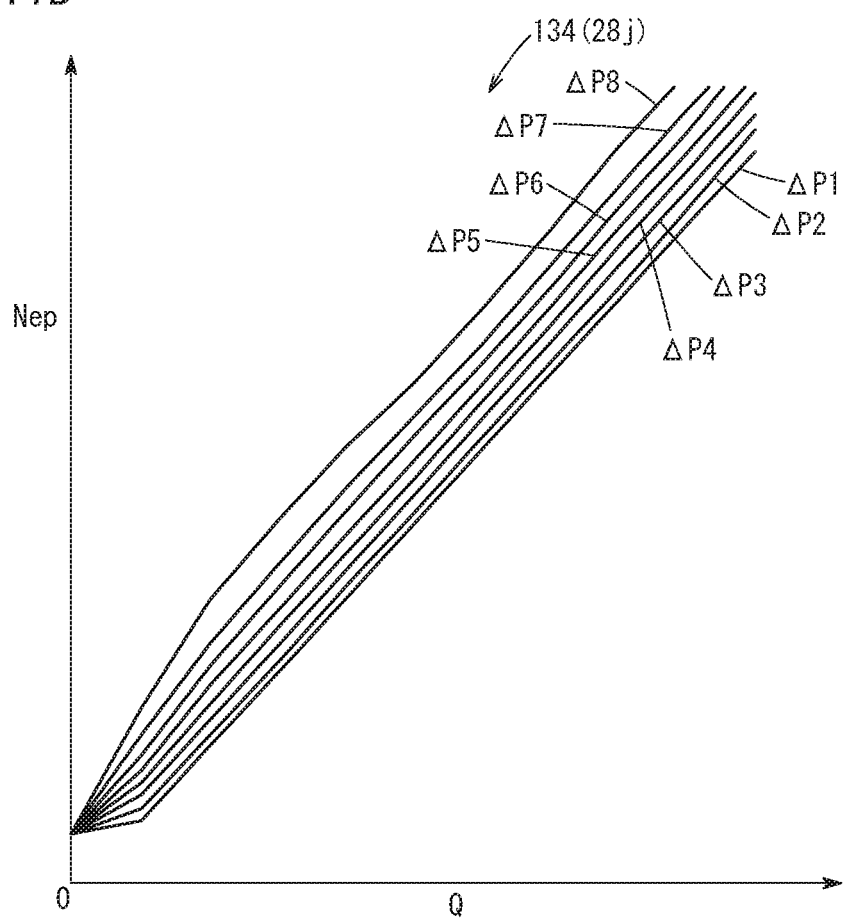
FIG. 11B is a diagram showing a map expressing a relation between a differential pressure and a rotation number of the second pump.

FIG. 11B shows a map 134 expressing a relation between the differential pressure ΔP and the rotation number Nep of the second pump 30. The map 134 shows characteristic lines each expressing the relation between the differential pressure ΔP and the rotation number Nep for each different differential pressure ΔP (ΔP1<ΔP2<...<ΔP7<ΔP8). Therefore, the operation point decision unit 28d can specify the command value of the rotation number Nep of the second pump 30 based on the operation point 132 (differential pressure ΔP and necessary flow rate Q). Note that since the controller 28i generates the control signal for the driver 34, the command value calculation unit 28h may perform the process of specifying the command value using the map 134 in FIG. 11B.

Figure 12:
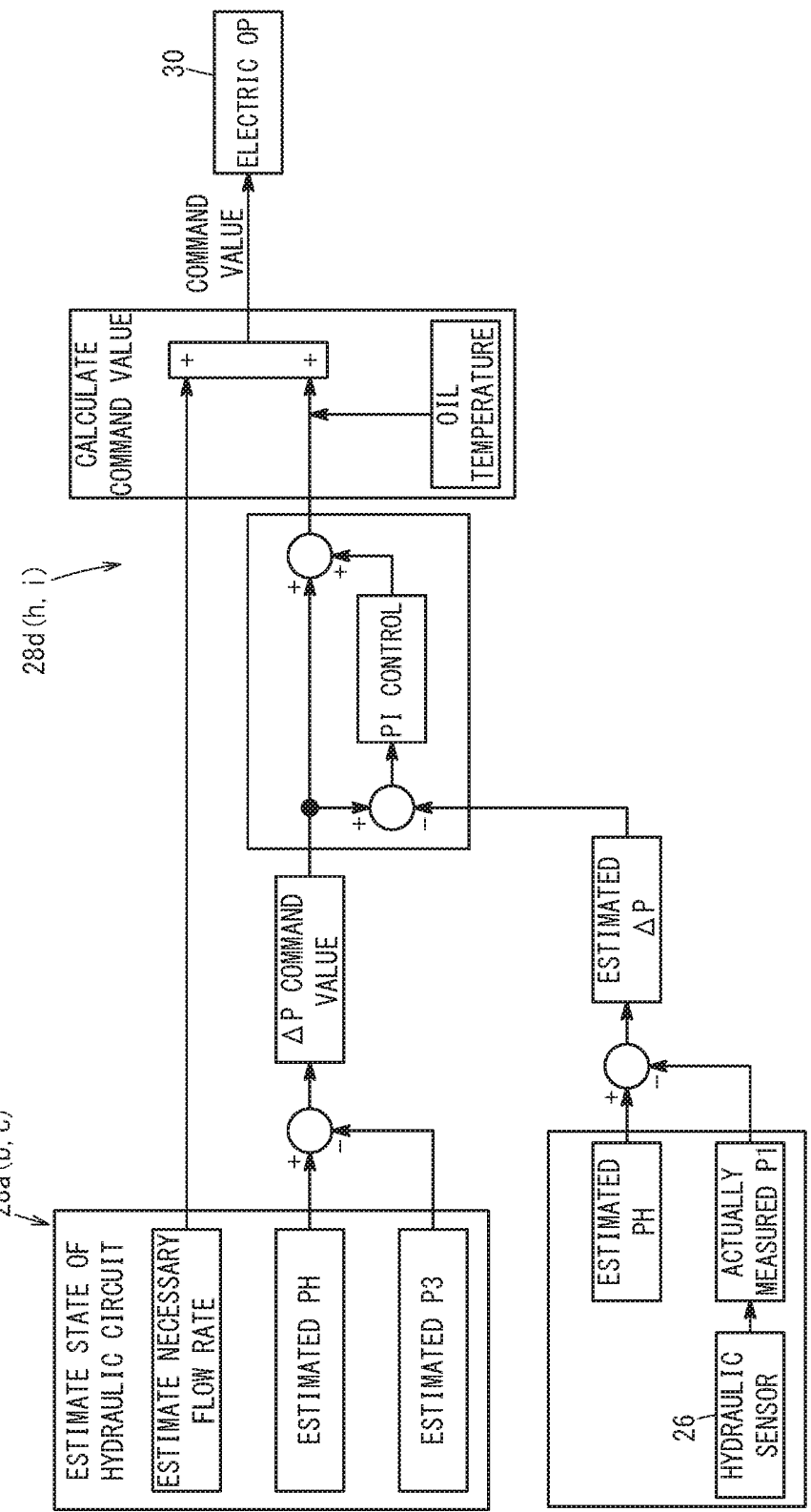
FIG. 12 is an explanatory diagram illustrating a process of calculating a command value in a control unit in a case where an output pressure is fed back.
Figure 13:
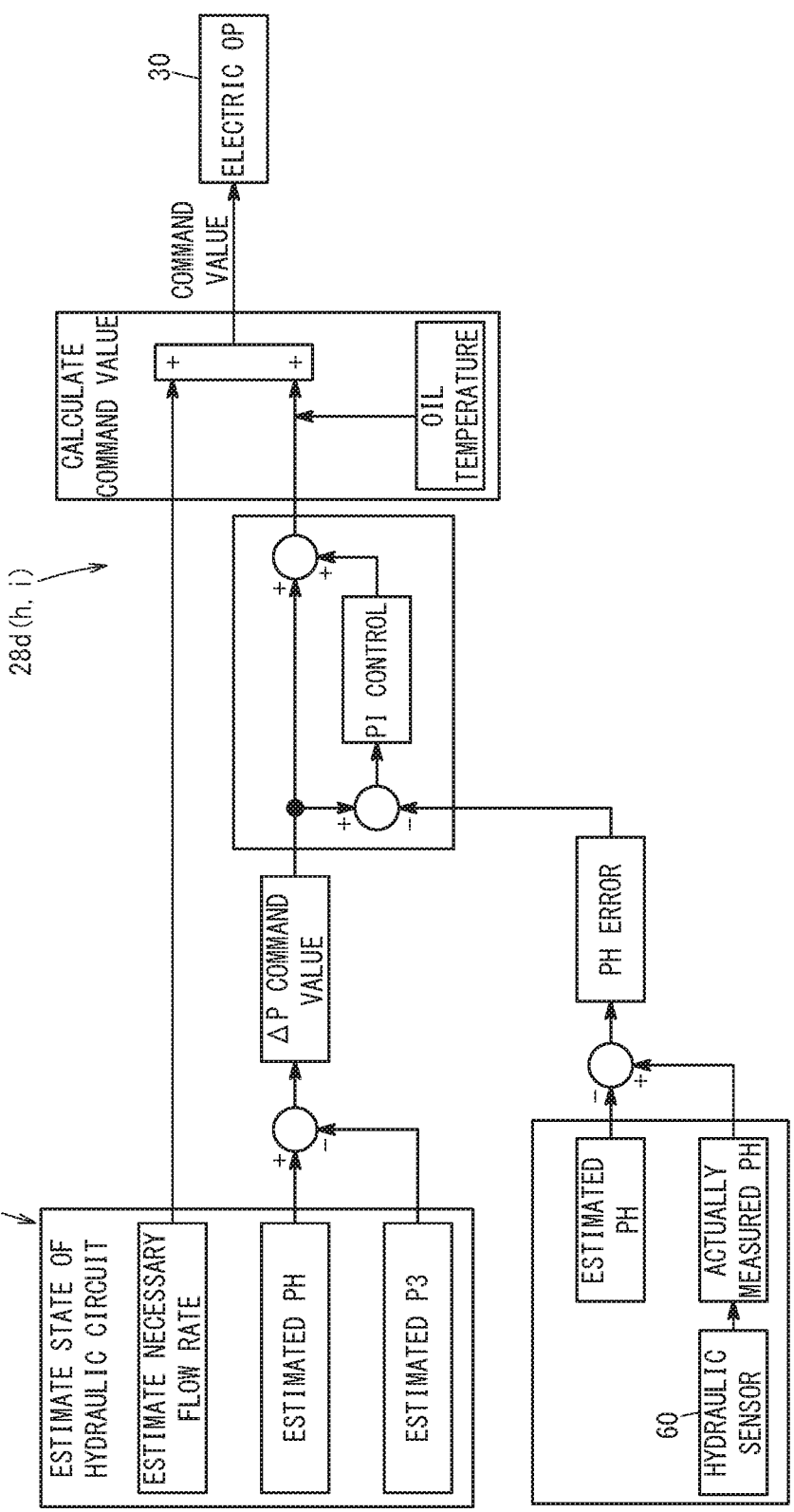
FIG. 13 is an explanatory diagram illustrating a process of calculating the command value in the control unit in a case where the line pressure is fed back.

In step S2, the control unit 28 further performs the feedback control for the differential pressure ΔP used in the decision of the operation point 132 by using the output pressure P1 detected by the output pressure sensor 26 or the line pressure PH detected by the line pressure sensor 60 as illustrated in FIG. 12 and FIG. 13.

FIG. 12 is an explanatory diagram illustrating a process in the control unit 28 that performs the feedback control for the differential pressure ΔP by using the output pressure P1 detected by the output pressure sensor 26. That is to say, FIG. 12 expresses a control method of performing the feedback control for the output pressure P1 assuming that the pressure P3 of the third oil is the target value, by feeding back the change quantity of the output pressure P1 due to the increase in rotation number Nep to the control unit 28.

In the case where the line pressure estimation unit 28b obtains the estimated line pressure PHe (estimated PH) and the low hydraulic pressure estimation unit 28c obtains the estimated value P3e (estimated P3) of the pressure P3 of the third oil, the operation point decision unit 28d generates a command value ΔPi of the differential pressure ΔP by subtracting the estimated value P3e from the estimated line pressure PHe (ΔPi=PHe−P3e). The operation point decision unit 28d calculates the estimated value ΔPe of the differential pressure ΔP by subtracting the output pressure P1 detected by the output pressure sensor 26 from the estimated line pressure PHe (ΔPe=PHe−P1).

Next, the operation point decision unit 28d obtains a deviation Δe by subtracting the estimated value ΔPe from the command value ΔPi (Δe=ΔPi−ΔPe). The obtained deviation Δe is put through a proportional integral element (PI control) and added to the command value ΔPi. That is to say, the operation point decision unit 28d performs the feedback control by using the deviation Δe as the feedback amount for the command value ΔPi.

In this case, Δe=ΔPi−ΔPe=(PHe−P3e)−(PHe−P1)=P1−P3e is satisfied. Therefore, the operation point decision unit 28d performs the feedback control for the command value ΔPi so that the output pressure P1 becomes the pressure P3 of the third oil (estimated value P3e). As a result, for example, in a time band from the time point t2 to the time point t3 in FIG. 5, even if the output pressure P1 cannot be reduced to the pressure P3 using the command value of an open control because of an error between a prescribed value of each pressure and an actual pressure value or variation in discharging capability of the second pump 30, the output pressure P1 can be reduced to the pressure P3 by the feedback control described above. Next, the operation point decision unit 28d regulates the command value ΔPi after the feedback control in consideration of the oil temperature To of the first oil or the second oil. After that, the operation point decision unit 28d performs the process of setting the operation point 132 described above by using the necessary flow rate Q and the command value ΔPi after the regulation.

On the other hand, FIG. 13 is an explanatory diagram illustrating a process in the control unit 28 that performs the feedback control for the differential pressure ΔP using the line pressure PH detected by the line pressure sensor 60. That is to say, FIG. 13 illustrates a control method of performing the feedback control for the line pressure PH assuming that the line pressure at the optimal operation point (PH0+ΔPHα) is the target value, by feeding back the change quantity of the line pressure PH due to the increase in rotation number Nep to the control unit 28.

In this case, the operation point decision unit 28d generates the command value ΔPi by subtracting the estimated value P3e from the estimated line pressure PHe, and on the other hand, calculates an error value ΔPHe of the line pressure PH by subtracting the estimated line pressure PHe from the line pressure PH detected by the line pressure sensor 60 (ΔPHe=PH−PHe).

Next, the operation point decision unit 28*d* obtains the deviation Δe by subtracting the error value ΔPHe from the command value ΔPi (Δe=ΔPi−ΔPHe). The obtained deviation Δe is put through a proportional integral element (PI control) and added to the command value ΔPi. In this case, the operation point decision unit 28*d* also performs the feedback control using the deviation Δe as the feedback amount for the command value ΔPi.

As described above, Δe=ΔPi−ΔPHe and ΔPHe=PH−PHe are satisfied; therefore, in a case where the error of the line pressure PH is zero, that is, the line pressure PH is an excessive hydraulic pressure, the operation point decision unit 28*d* performs the feedback control for the command value ΔPi so that the command value ΔPi is reduced to the line pressure PH at the optimal operation point (optimal control zone). Even in this case, the operation point decision unit 28*d* regulates the command value ΔPi after the feedback control in consideration of the oil temperature To of the first oil or the second oil. After that, the operation point decision unit 28*d* performs the process of setting the operation point 132 described above by using the necessary flow rate Q and the command value ΔPi after the regulation.

In the next step S3, the operation point decision unit 28*d* determines whether the decided operation point 132 is appropriate. In this case, if the operation point 132 exists inside a discharging capability limit line expressing a limit of the discharging capability of the second pump 30 (differential pressure ΔP and necessary flow rate Q that are lower than discharging capability limit line), the operation point decision unit 28*d* determines that the second pump 30 can be driven at the operation point 132 (step S3: YES).

On the other hand, if the operation point 132 exists outside the discharging capability limit line, the operation point decision unit 28*d* determines that the second pump 30 cannot be driven at the decided operation point 132, that is, the operation point 132 is inappropriate (step S3: NO), and the process advances to the next step S4. In step S4, since the second pump 30 cannot be driven at the operation point 132 that is decided by the operation point decision unit 28*d*, the command value calculation unit 28*h* calculates the command value that instructs to ignore the operation point 132, and stop the second pump 30 or operate the second pump 30 in the low-rotation state. The controller 28*i* supplies the control signal based on the calculated command value to the driver 34.

On the basis of the supplied control signal, the driver 34 stops the motor 32 or controls the motor 32 so as to be in the low-rotation state. Thus, the second pump 30 stops or is operated in the low-rotation state. As a result, as the flow rate of the second oil decreases (pressure of the second oil decreases), the check valve 58 is opened, so that the first pump 20 supplies the first oil to the continuously variable transmission mechanism 56 through the check valve 58.

When, in the low-rotation state or stop state, the operation point of the second pump 30 is determined to be appropriate and the control unit 28 outputs to the driver 34 the command value to instruct to drive the second pump 30, performing the feedback control in the middle of increasing the rotation number Nep of the second pump 30 to the rotation number based on the command value may accumulate the deviation and the command value becomes high more than necessary. In such a state, the control unit 28 performs the determination process to stop the feedback control.

Note that if the determination result in step S3 is negative (step S3: NO), the process can return to step S1 as shown by a dashed line in FIG. 7, and the process in step S1 can be repeated.

On the other hand, if the determination result in step S3 is positive (step S3: YES), the process advances to the next step S5. In step S5, the workload calculation unit 28*e* calculates the reduced amount of workload in the first pump 20 that is reduced by the driving of the second pump 30.

Here, the workloads of the first pump 20 and the second pump 30 are described with reference to FIG. 9. As shown in FIG. 9 where the horizontal axis indicates the flow rate of the oil (first to third oil) and the vertical axis indicates the hydraulic pressure (pressure P3 of the third oil, line pressure PH), the hydraulic control device 10 requires the following flow rates (1) to (3) of the oil in order to perform the hydraulic control on the transmission 12.

(1) A flow rate of the oil to be supplied to the driven pulley 56*a* and the driving pulley 56*b* in the continuously variable transmission mechanism 56, and a flow rate of the oil to be supplied to the forward clutch 82*a* and the reverse brake clutch 82*b*. These flow rates correspond to a portion denoted by "LEAK AND SHIFT" in FIG. 9. In these flow rates, a "PULLEY" part corresponds to the flow rate of the oil to be supplied to the continuously variable transmission mechanism 56, and a "CLUTCH" part corresponds to the flow rate of the oil to be supplied to the forward clutch 82*a* and the reverse brake clutch 82*b*. These flow rates include the flow rate necessary in the shift operation in the transmission 12, and the leak amount in the valve or the oil passage to the continuously variable transmission mechanism 56, the forward clutch 82*a*, and the reverse brake clutch 82*b*.

(2) A flow rate of the oil to be supplied to the torque converter 114 including the lockup clutch 112, and the oil warmer 106. This flow rate corresponds to a portion denoted by "WARMER FLOW RATE" in FIG. 9. This flow rate includes the leak amount in the valve or the oil passage to the torque converter 114 and the oil warmer 106, and the flow rate of the oil to be supplied to the pulley shaft 56*c*, the bearing 56*d*, and the belt 56*e* that are connected to the downstream side of the oil warmer 106.

(3) A flow rate of the oil to be supplied to the lubrication system 108. This flow rate corresponds to a portion denoted by "LUBRICATION FLOW RATE" in FIG. 9. This flow rate includes the leak amount in the valve or the oil passage to the lubrication system 108.

As described above, the pressures of the first to third oil change depending on whether the first pump 20 is operated alone or both the first pump 20 and the second pump 30 are operated.

When the first pump 20 is operated alone, it is necessary to supply the first oil from the first pump 20 to the continuously variable transmission mechanism 56 through the check valve 58; therefore, the pressure of the first oil is the line pressure PH (PH pressure). In this case, it is necessary that the first pump 20 supplies the first oil to the continuously variable transmission mechanism 56 in a state that the first oil is pressurized up to the line pressure PH in which a differential pressure ΔP (ΔP=PH−P3) is added to the pressure P3 of the third oil (pressure of first oil before pressurization). In this case, the workload of the first pump 20 (first workload) when the first pump 20 is operated alone is obtained by multiplying the line pressure PH by the "LEAK AND SHIFT", "WARMER FLOW RATE", and "LUBRICATION FLOW RATE". The output pressure sensor 26 detects the line pressure PH as the output pressure P1.

On the other hand, when both the first pump 20 and the second pump 30 are operated, it is only necessary that the first pump 20 supplies the first oil to the second pump 30 through the oil passage 22; thus, the pressure of the first oil is reduced to the pressure P3. As a result, the second pump 30 pressurizes the first oil from the pressure P3 to the line pressure PH, and supplies the first oil that is pressurized to the continuously variable transmission mechanism 56 as the second oil. That is to say, the second pump 30 pressurizes the first oil by the differential pressure ΔP, and supplies the first oil to the continuously variable transmission mechanism 56 as the second oil. Note that the output pressure sensor 26 detects the pressure P3 as the output pressure P1.

The second pump 30 is a small-capacity electric pump, and performs the work of a portion drawn with a dash-dot line in FIG. 9. In this case, the workload of the second pump 30 is obtained by multiplying the differential pressure ΔP by the flow rate of "LEAK AND SHIFT".

In the transmission 12, the oil to be supplied to the continuously variable transmission mechanism 56 has the highest pressure, and the oil to be supplied to the forward clutch 82a and the reverse brake clutch 82b has the second highest pressure. Therefore, in the workload of the second pump 30, a block above the "CLUTCH" is an unnecessary work for the second pump 30 in FIG. 9. That is to say, when the oil with the pressure equivalent to that in the continuously variable transmission mechanism 56 is supplied to the forward clutch 82a and the reverse brake clutch 82b, the loss due to the "UNNECESSARY WORKLOAD" also occurs.

When the second pump 30 is operated, the work in the first pump 20 can be cut by the "AMOUNT OF WORKLOAD CUT" in FIG. 9. That is to say, the workload of the first pump 20 (second workload) is obtained by multiplying the pressure P3 by the flow rates of "LEAK AND SHIFT", "WARMER FLOW RATE", and "LUBRICATION FLOW RATE".

Note that in the hydraulic operation unit of the low-pressure system in the transmission 12, the pressure of the oil to be supplied to the lubrication system 108 is the lowest. Therefore, in FIG. 9, a block between "AMOUNT OF WORKLOAD CUT" and "LUBRICATION" in the second workload is an unnecessary work for the first pump 20. That is to say, when the oil with the pressure equivalent to that in the torque converter 114, the oil warmer 106, or the like is supplied to the lubrication system 108, the loss due to the unnecessary workload still occurs. When the vehicle 14 cruises, the lateral pressure (pulley pressure) may be lower than the pressure P3. The present embodiment, however, will describe on the basis of the illustration in FIG. 9.

As described above, the battery 44 is charged with the power generated by the ACG 40 through the rectifier 42, and when the power is supplied from the battery 44 to the driver 34 and the motor 32 is driven under a control operation of the driver 34, the second pump 30 is operated. In this case, the ACG 40 wastes the workload more than or equal to the power necessary to drive the motor 32 (second pump 30). Therefore, the amount of power generated in the ACG 40 corresponds to the amount of workload loss in regard to the supply of the second oil by the second pump 30 (workload of generating power by the ACG 40).

The ACG 40 does the work of supplying power to each part of the vehicle 14; however, it should be noted that only the power to be consumed in the second pump 30 is handled in the present embodiment. In this case, the workload of generating the power by the ACG 40 is obtained as follows: (a workload of generating power by the ACG 40)=(a power consumed by the second pump 30)/(a power generation efficiency of the ACG 40).

Therefore, in step S5, the workload calculation unit 28e calculates the workload when the first pump 20 is operated alone (first workload) and the workload of the first pump 20 when both the first pump 20 and the second pump 30 are operated (second workload) in such a way that: the discharging flow rate of the first pump 20 is estimated on the basis of the engine rotation number New (rotation number Nmp of the first pump 20) from the engine rotation number sensor 116, and the estimated discharging flow rate and the line pressure PH estimated by the line pressure estimation unit 28b are multiplied. Alternatively, the workload calculation unit 28e may calculate the workload of the first pump 20 by using the engine rotation number New and the estimated friction torque of the first pump 20.

Next, the workload calculation unit 28e estimates the power consumption (workload) of the second pump 30 (motor 32) by using the operation point 132 of the second pump 30 that is estimated by the operation point decision unit 28d or using the torque and the rotation number Nep of the second pump 30 (rotation number Nem of motor 32). On the basis of the estimated power consumption of the second pump 30 and the power generation efficiency of the ACG 40, the workload calculation unit 28e estimates the amount of workload loss (power generation workload) of the ACG 40.

Next, the workload calculation unit 28e calculates the reduced amount of workload in the first pump 20 by subtracting the second workload and the amount of workload loss of the ACG 40 from the first workload.

In step S6, the diagnosis unit 28f diagnoses the state of each part in the vehicle 14 on the basis of the detection results of the various sensors in the vehicle 14. For example, the diagnosis unit 28f diagnoses the state of the battery 44 on the basis of the voltage V of the battery 44 that is detected by the voltage sensor 46 and the current I that is detected by the current sensor 48.

In step S7, the workload determination unit 28g determines whether the reduced amount of workload that is calculated in the workload calculation unit 28e is more than a predetermined threshold α and whether each part in the vehicle 14 is normal. If the reduced amount of workload is more than the predetermined threshold α and each part in the vehicle 14 is normal (step S7: YES), the workload determination unit 28g determines whether the fuel cut for the engine 16 is performed on the basis of the opening of an accelerator pedal that is detected by the accelerator sensor 122 in the next step S8.

In the case where the fuel cut is not performed (step S8: NO), at the time of a reception of the determination result from the workload determination unit 28g, the command value calculation unit 28h determines that the workload of the first pump 20 is reduced if the second pump 30 is operated at the operation point 132 that is decided by the operation point decision unit 28d, and thus, calculates the command value based on the operation point 132 in the next step S9. The controller 28i supplies the control signal based on the calculated command value to the driver 34. Accordingly, the driver 34 can drive the motor 32 on the basis of the supplied control signal and can rotate the second pump 30.

On the other hand, if the determination result in step S7 is negative (step S7: NO), the process advances to step S4. In step S4, the command value calculation unit 28h determines that the reduced amount of workload is less than or equal to the threshold α and the effect of reducing the workload of the first pump 20 by the operation of the second pump 30 cannot be obtained or that a device in the vehicle 14 has an abnormality and appropriate hydraulic control for the transmission 12 cannot be performed. Then, the command value calculation unit 28h ignores the operation point 132 decided by the operation point decision unit 28d, and calculates a command value that instructs the second pump 30 to stop, or to operate in the low-rotation state. The controller 28i supplies the control signal based on the calculated command value to the driver 34. Even in this case, on the basis of the supplied control signal, the driver 34 stops the motor 32 or controls the motor 32 so as to be in the low-rotation state. Thus, the second pump 30 stops or is operated in the low-rotation state.

Even if the determination result in step S7 is positive, the process advances to step S4 when the determination result in step S8 is positive (steps S7, S8: YES). In this case, even if the device in the vehicle 14 is normal and the reduced amount of workload is more than the threshold α, the fuel cut is currently performed; therefore, the command value calculation unit 28h determines that the improvement of the fuel efficiency due to the fuel cut may be offset by the amount of workload loss of the ACG 40, for example. That is to say, in the case where the fuel cut is performed, the fuel consumption is stopped or reduced, so that the burden on the first pump 20 can be reduced and the workload of the first pump 20 can be reduced. However, operating the second pump 30 may result in the increase in amount of workload loss in the ACG 40 and the fuel efficiency may deteriorate. Even in this case, step S4 is performed and the command value calculation unit 28h calculates the command value to instruct to stop the second pump 30 or operate the second pump 30 in the low-rotation state. The controller 28i supplies the control signal based on the calculated command value to the driver 34.

3. Effect of the Present Embodiment

As described above, in the hydraulic control device 10 according to the present embodiment, the output pressure sensor 26 is disposed on an intake side (upstream side) of the second pump 30 where the first oil is taken in and the line pressure sensor 60 is disposed on a discharging side (downstream side) of the second pump 30 where the second oil is discharged. The control unit 28 (controller 28i thereof) controls the motor 32 on the basis of the output pressure P1 detected by the output pressure sensor 26 or the line pressure PH detected by the line pressure sensor 60, so as to control the second pump 30.

Thus, the detected output pressure P1 or line pressure PH is fed back to the control unit 28. Therefore, by controlling the motor 32 using the output pressure P1 or the line pressure PH, the control unit 28 can control the driving of the second pump 30 optimally. As a result, it is possible to suppress the deterioration in fuel efficiency of the vehicle 14 including the transmission 12, and the occurrence of the hydraulic response delay in the continuously variable transmission mechanism 56.

By the hydraulic control device 10 with such a structure, the second pump 30 can be regularly controlled optimally through the motor 32 under various travel conditions of the vehicle 14. In addition, the workload of the first pump 20 can be cut while the power consumption of the motor 32 and the second pump 30 is minimized. Furthermore, since the optimal control is performed, the pressure of the oil to be supplied to the continuously variable transmission mechanism 56 does not become excessive. Thus, the decrease in hydraulic pressure or the hydraulic response delay when the pump that supplies the oil to the continuously variable transmission mechanism 56 is switched from the second pump 30 to the first pump 20 can be minimized.

In addition, the control unit 28 includes the vehicle state grasping unit 28a, the operation point decision unit 28d, and the command value calculation unit 28h. The operation point decision unit 28d performs the feedback control for the command value ΔPi of the differential pressure ΔP by using the output pressure P1 or the line pressure PH that is detected, and sets the operation point 132 by using the command value ΔPi after the feedback control and the necessary flow rate Q. Moreover, the command value calculation unit 28h calculates the command value based on the operation point 132 decided by the operation point decision unit 28d, and the controller 28i supplies the control signal based on the calculated command value to the driver 34 so as to control the motor 32.

Thus, the second pump 30 can be controlled by using the output pressure P1 or the line pressure PH that is fed back, so that the rotation number Nep or the torque becomes optimal.

In addition, in the control unit 28, the line pressure estimation unit 28b estimates the line pressure PH (estimated line pressure PHe), and the low hydraulic pressure estimation unit 28c estimates the pressure P3 of the third oil (estimated value P3e). In this case, the operation point decision unit 28d calculates the feedback amount relative to the command value ΔPi by subtracting the estimated value P3e from the detected output pressure P1 as shown in FIG. 12, or calculates as the feedback amount, the error value ΔPHe by subtracting the estimated line pressure PHe from the detected line pressure PH as shown in FIG. 13.

In any case, the deviation between the detected pressure value (actually measured value) and the estimated value corresponds to the feedback amount, and the operation point decision unit 28d sets the operation point 132 so that the actually measured value becomes the estimated value. As a result, even in a case where there are variations in the actually measured value (output pressure P1, line pressure PH), the estimated value (estimated line pressure PHe, estimated value P3e), the structure and the efficiency of the second pump 30 (volume efficiency and machine efficiency of the second pump 30), and the hydraulic system in the transmission 12 (leak amount in oil passage or valve), the command value ΔPi is calculated so as to minimize the deviation. By controlling the motor 32 on the basis of the calculated command value ΔPi, the driving of the second pump 30 can be controlled optimally.

The present invention is not limited to the above embodiment and may employ various structures on the basis of the description in the present specification.

What is claimed is:

1. A hydraulic control device including, between a first pump and a hydraulic operation unit of a transmission, a check valve and a second pump driven by a motor connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil, the hydraulic control device comprising:

a hydraulic sensor provided on at least one of an intake side of the second pump where the first oil is taken in and a discharging side of the second pump where the second oil is discharged, and configured to detect a pressure of the oil at a position where the hydraulic sensor is provided;

a controller configured to control driving of the second pump by controlling the motor on a basis of the pressure of the oil detected by the hydraulic sensor; and an operation point decision unit configured to set an operation point of the second pump on a basis of a request flow rate corresponding to a request value of a flow rate of the second oil and a request discharging pressure corresponding to a request value of a discharging pressure of the second pump in accordance with a vehicle state of the vehicle including the transmission, wherein:

the operation point decision unit is configured to perform a feedback control for the request discharging pressure by using the pressure of the oil detected by the hydraulic sensor and set the operation point by using the request discharging pressure after the feedback control and the request flow rate; and the controller is configured to control the motor on a basis of the operation point.

2. The hydraulic control device according to claim 1, further comprising a first hydraulic pressure estimation unit configured to estimate a pressure value of the oil to be supplied from the first pump to another hydraulic operation unit of the transmission, wherein:

the hydraulic sensor is a hydraulic sensor that is provided between the first pump and the second pump and configured to detect the pressure value of the first oil to be supplied to the second pump; and the operation point decision unit is configured to calculate a feedback amount relative to the request discharging pressure by subtracting the pressure value of the oil estimated by the first hydraulic pressure estimation unit from the pressure value of the first oil detected by the hydraulic sensor.

3. The hydraulic control device according to claim 1, further comprising a second hydraulic pressure estimation unit configured to estimate a pressure value of the oil to be supplied to the hydraulic operation unit, wherein:

the hydraulic sensor is a hydraulic sensor that is provided between the second pump and the hydraulic operation unit and configured to detect the pressure value of the oil to be supplied to the hydraulic operation unit; and the operation point decision unit is configured to calculate a feedback amount relative to the request discharging pressure by subtracting the pressure value of the oil estimated by the second hydraulic pressure estimation unit from the pressure value of the oil detected by the hydraulic sensor.

* * * * *